(12) United States Patent
Maekubo et al.

(10) Patent No.: US 10,449,988 B2
(45) Date of Patent: Oct. 22, 2019

(54) STEERING WHEEL

(71) Applicant: KABUSHIKI KAISHA TOKAI-RIKA-DENKI-SEISAKUSHO, Aichi-ken (JP)

(72) Inventors: Yoshiaki Maekubo, Aichi-ken (JP); Ichiro Yamamoto, Aichi-ken (JP); Taichi Hino, Aichi-ken (JP); Tamio Harada, Aichi-ken (JP); Hiroshi Ohira, Aichi-ken (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 116 days.

(21) Appl. No.: 15/088,303

(22) Filed: Apr. 1, 2016

(65) Prior Publication Data

US 2016/0288815 A1 Oct. 6, 2016

(30) Foreign Application Priority Data

Apr. 6, 2015 (JP) .................................. 2015-077904

(51) Int. Cl.
*B62D 1/06* (2006.01)
(52) U.S. Cl.
CPC ....................................... *B62D 1/06* (2013.01)
(58) Field of Classification Search
CPC ............... B62D 1/06; B62D 1/11; B62D 1/04
See application file for complete search history.

(56) References Cited

U.S. PATENT DOCUMENTS

| 6,360,632 | B1* | 3/2002 | Papandreou | B62D 1/06 74/552 |
| 6,564,674 | B2* | 5/2003 | Ishii | B62D 1/06 74/552 |
| 2010/0050808 | A1* | 3/2010 | Min | B62D 1/06 74/552 |
| 2010/0199802 | A1* | 8/2010 | Guillaume | B62D 1/06 74/558 |

FOREIGN PATENT DOCUMENTS

| DE | 10213799 C1 | 8/2003 |
| JP | S55170168 U | 12/1980 |
| JP | 2000-043736 A | 2/2000 |
| JP | 2011111102 A | 6/2011 |
| JP | 2013018336 A | 1/2013 |
| JP | 2014151863 A | 8/2014 |
| JP | 2014205373 A | 10/2014 |

OTHER PUBLICATIONS

Translation of JP 2014205373.*

(Continued)

*Primary Examiner* — Vicky A Johnson
(74) *Attorney, Agent, or Firm* — Roberts Mlotkowski Safran Cole & Calderon, P.C.

(57) ABSTRACT

There is provided a steering wheel including (1) a resin body made of resin, (2) a decorative body that is provided separately from the resin body, and (3) a placement member that is disposed between the resin body and the decorative body and that is moved by the decorative body when the decorative body has been relatively displaced.

5 Claims, 15 Drawing Sheets

(56) References Cited

OTHER PUBLICATIONS

Extended European Search Report for corresponding European Patent Application 16163795.4 dated Sep. 12, 2016.
Korean Patent Application No. 10-2016-0036684 Office Action, dated May 1, 2017, and English translation thereof.
Office Action issued in the corresponding Japanese Application No. 2015-077904 dated Jan. 9, 2018.
Office Action issued in the corresponding Chinese application No. 201610183694.6 dated Nov. 27, 2017.

* cited by examiner

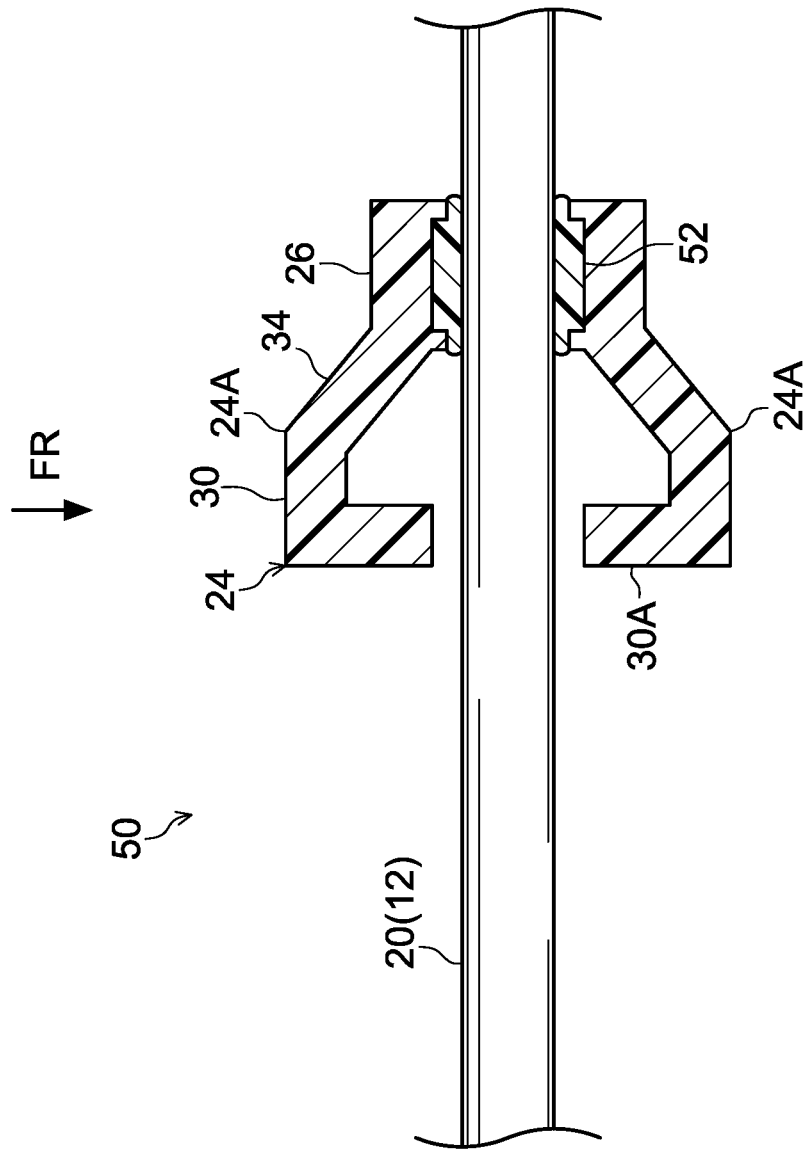

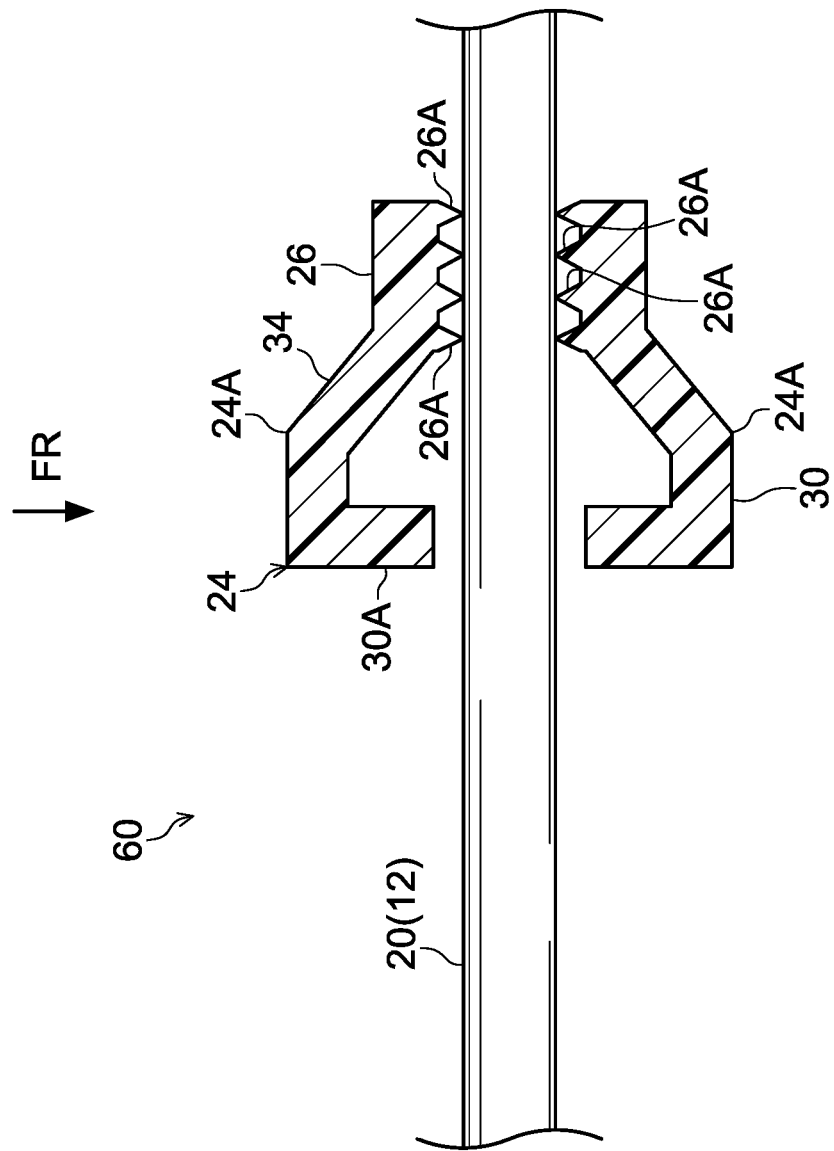

STEERING WHEEL

CROSS-REFERENCE TO RELATED APPLICATION

This application claims priority under 35 USC 119 from Japanese Patent Application No. 2015-077904 filed on Apr. 6, 2015, the disclosure of which is incorporated by reference herein.

BACKGROUND

Technical Field

The present disclosure relates to a steering wheel in which a placement member is disposed between a resin body and a decorative body.

Related Art

In a steering wheel described in Japanese Patent Application Laid-Open (JP-A) No. 2000-43736, a member that is not leather, such as a wooden member, is provided adjacent to a resin layer.

However, a placement member is sometimes disposed between the resin layer and the non-leather member in such steering wheels.

It is preferable that damage to the non-leather member by the placement member can be suppressed when the non-leather member has been displaced with respect to the placement member in such steering wheels.

SUMMARY

In consideration of the above circumstances, the present disclosure provides a steering wheel capable of suppressing damage to a decorative body by a placement member when the decorative body has been displaced with respect to the placement member.

A first aspect of the present disclosure is a steering wheel including a resin body made of resin, a decorative body that is provided separately from the resin body, and a placement member that is disposed between the resin body and the decorative body and that is moved by the decorative body when the decorative body has been relatively displaced.

A second aspect of the present disclosure is the steering wheel of the first aspect, wherein the placement member is moved by being deformed by the decorative body.

A third aspect of the present disclosure is the steering wheel of the first aspect or the second aspect, further including an attachment portion that is provided at the placement member and that is attached to the placement member, wherein the attachment to the placement member is released, and the placement member is moved, by the decorative body.

A fourth aspect of the present disclosure is the steering wheel of any one of the first aspect to the third aspect, wherein the placement member is moved by being broken by the decorative body.

A fifth aspect of the present disclosure is the steering wheel of any one of the first aspect to the fourth aspect, wherein the placement member is moved by being tilted by the decorative body.

A sixth aspect of the present disclosure is the steering wheel of any one of the first aspect to the fifth aspect, wherein only an outer peripheral side portion of the placement member moved by the decorative body presses the resin body.

A seventh aspect of the present disclosure is the steering wheel of any one of the first aspect to the sixth aspect, wherein a portion of the placement member at the opposite side to an occupant is moved by the decorative body.

An eighth aspect of the present disclosure is a steering wheel including a resin body made of resin, a decorative body that is provided separately from the resin body, and a placement member that is disposed between the resin body and the decorative body, and covering material that covers the placement member and that is provided with an insertion portion inserted between the decorative body and the placement member, wherein the insertion portion is moved inside the placement member by the decorative body when the decorative body has been displaced with respect to the placement member.

A ninth aspect of the present disclosure is the steering wheel of the eighth aspect, wherein a portion of the insertion portion at the opposite side to an occupant is moved inside the placement member by the decorative body.

In the steering wheel of the first aspect, the decorative body is provided separately from the resin body, and the placement member is disposed between the resin body and the decorative body.

Note that the placement member is moved by the decorative body when the decorative body has been displaced with respect to the placement member. This enables damage to the decorative body by the placement member to be suppressed.

In the steering wheel of the second aspect, the placement member is moved by being deformed by the decorative body. This enables the placement member to be moved using a simple configuration.

In the steering wheel of the third aspect, the attachment portion is provided at the decorative body, and the placement member is attached at the attachment portion.

Note that the attachment of the placement member at the attachment portion is released, and the placement member is moved, by the decorative body. This enables the placement member to be moved using a simple configuration.

In the steering wheel of the fourth aspect, the placement member is moved by being broken by the decorative body. This enables the placement member to be moved using a simple configuration.

In the steering wheel of the fifth aspect, the placement member is moved by being tilted by the decorative body. This enables the placement member to be moved using a simple configuration.

In the steering wheel of the sixth aspect, only the outer peripheral side portion of the placement member moved by the decorative body presses the resin body. This enables movement of the placement member by the decorative body to be suppressed from being impeded by the resin body, and enables damage to the decorative body by the placement member to be effectively suppressed.

In the steering wheel of the seventh aspect, the portion of the placement member at the opposite side to the occupant is moved by the decorative body. Thus, even when load has been input from the decorative body to the portion of the placement member at the opposite side to the occupant due to load being input from the occupant to the decorative body and the decorative body being displaced toward the opposite side to the occupant with respect to the resin body, the portion of the placement member at the opposite side to the occupant is moved by the decorative body, thereby enabling damage to the decorative body by the placement member to be suppressed.

In the steering wheel of the eighth aspect, the decorative body is provided separately from the resin body, and the placement member is disposed between the resin body and the decorative body. The covering material covers the placement member, and the insertion portion of the covering material is inserted between the decorative body and the placement member.

Note that the insertion portion is moved inside the placement member by the decorative body when the decorative body has been displaced with respect to the placement member. This enables damage to the decorative body by the placement member to be suppressed.

In the steering wheel of the ninth aspect, the portion of the insertion portion at the opposite side to an occupant is moved inside the placement member by the decorative body. Thus, even when load has been input from the decorative body to the portion of the placement member at the opposite side to the occupant due to load being input from the occupant to the decorative body and the decorative body being displaced toward the opposite side to the occupant with respect to the resin body, the portion of the insertion portion at the opposite side to the occupant is moved inside the placement member by the decorative body, thereby enabling damage to the decorative body by the placement member to be suppressed.

BRIEF DESCRIPTION OF THE DRAWINGS

Exemplary embodiments of the present disclosure will be described in detail based in the following figures, wherein:

FIG. 5 is a cross-section (a cross-section along the position of line 4-4 in FIG. 1) illustrating relevant portions of a steering wheel according to a second exemplary embodiment of the present disclosure;

FIG. 6 is a cross-section (a cross-section along the position of line 4-4 in FIG. 1) illustrating relevant portions of a steering wheel according to a third exemplary embodiment of the present disclosure;

DETAILED DESCRIPTION

First Exemplary Embodiment

Figure 1:
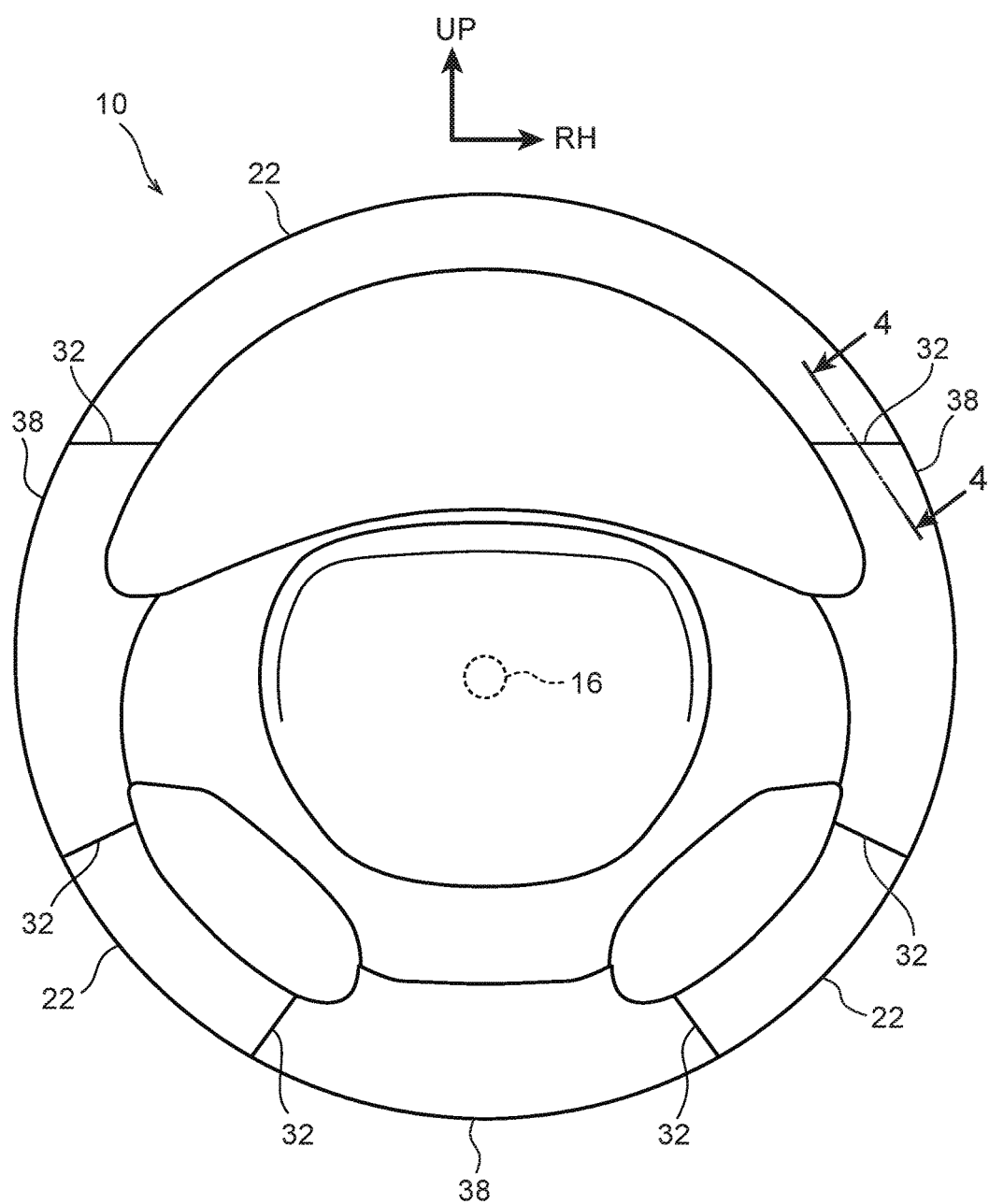
FIG. 1 is a face-on view illustrating a steering wheel according to a first exemplary embodiment of the present disclosure, viewed from the vehicle rear side.
Figure 2:
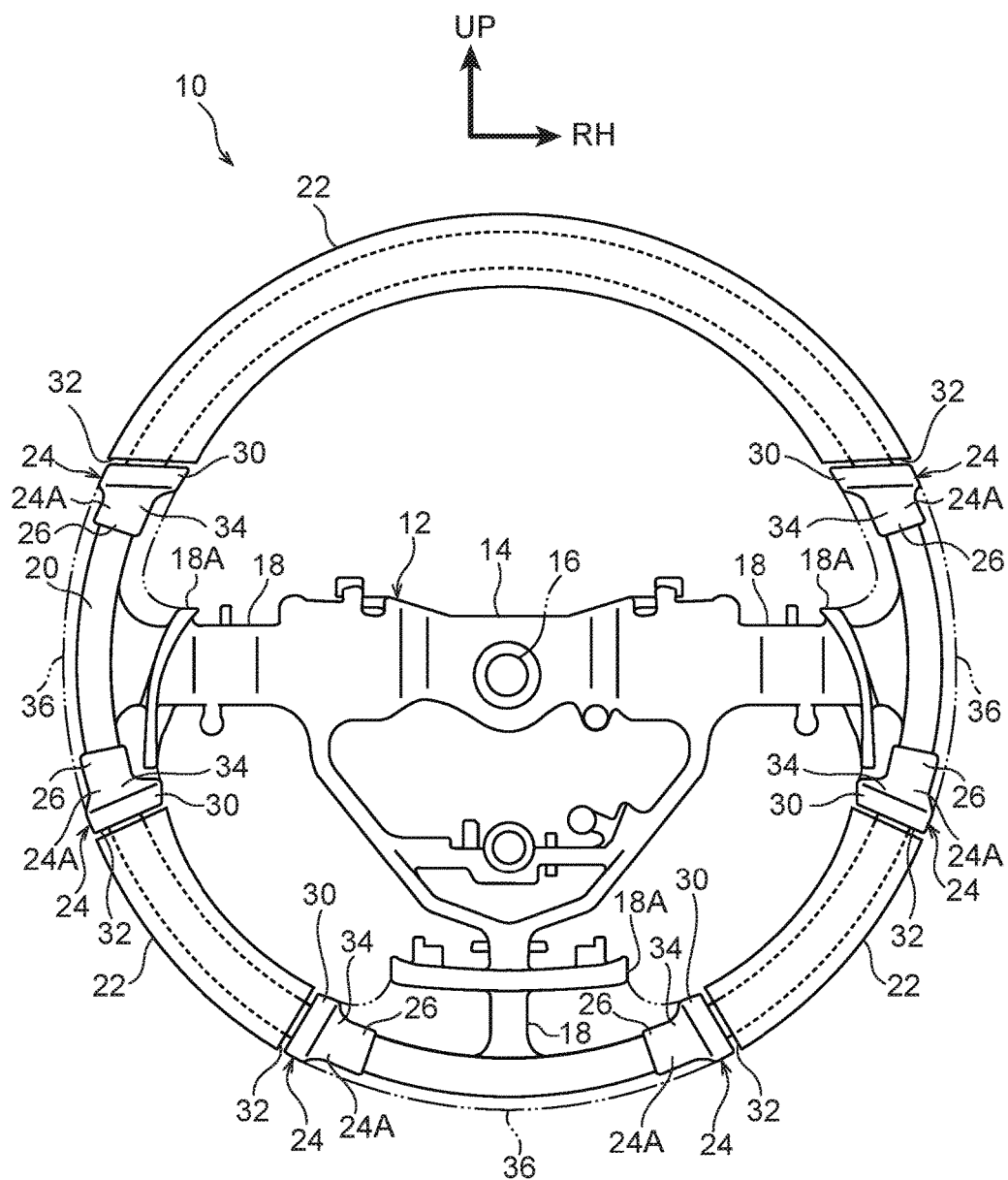
FIG. 2 is a face-on view illustrating an internal structure of a steering wheel according to the first exemplary embodiment of the present disclosure, viewed from the vehicle rear side.

FIG. 1 is a face-on view illustrating a steering wheel 10 according to a first exemplary embodiment of the present disclosure viewed from the vehicle rear side, and FIG. 2 is a face-on view of an internal structure of the steering wheel 10 viewed from the vehicle rear side. Note that in the drawings, the arrow FR indicates the vehicle front side, the arrow RH indicates the vehicle right side, and the arrow UP indicates the upper side.

The steering wheel 10 according to the present exemplary embodiment faces a vehicle driving seat at the vehicle rear side thereof, and the steering wheel 10 is disposed at the vehicle front side of an occupant (driver) seated in the driving seat.

As illustrated in FIG. 2, the steering wheel 10 is provided with a metal core 12 made of metal and serving as a frame member, and a plate shaped boss section 14, serving as a center section, is provided at a center portion of the metal core 12. The boss section 14 is fixed to a vehicle rear side end (upper end) of a circular column shaped steering shaft 16, serving as a support shaft, and the steering wheel 10 (metal core 12) is supported by the steering shaft 16 so as to be capable of rotating integrally therewith. Thus, the steering shaft 16 is rotated about its axis when the occupant rotates the steering wheel 10 in the circumferential direction to steer the vehicle.

Three elongated plate shaped spoke sections 18, serving as connecting sections, are integrally provided at an outer periphery of the boss section 14, and the spoke sections 18 respectively extend from the boss section 14 toward the vehicle right side, the vehicle left side, and the lower side (the radial direction outside of the steering wheel 10 and the steering shaft 16). A plate shaped extension portion 18A is integrally formed at an extension direction intermediate portion of each spoke section 18, and the extension portion 18A extends out from the spoke section 18 about the entire circumference of, and along the extension direction of, the spoke section 18.

A rim section 20 with an annular shape in face-on view and serving as an outer peripheral section (fixed section) is integrally provided at extension leading ends of the three spoke sections 18.

Circular tube shaped wood members 22 (wood grain material), serving as a decorative body, are respectively fixed to the upper side, diagonal lower right side, and diagonal lower left side of the rim section 20. The wood members 22 curve so as to extend along the extension direction (length direction) of the rim section 20, and cover the entire circumference of, and along the extension direction of, the rim section 20.

Figure 3:
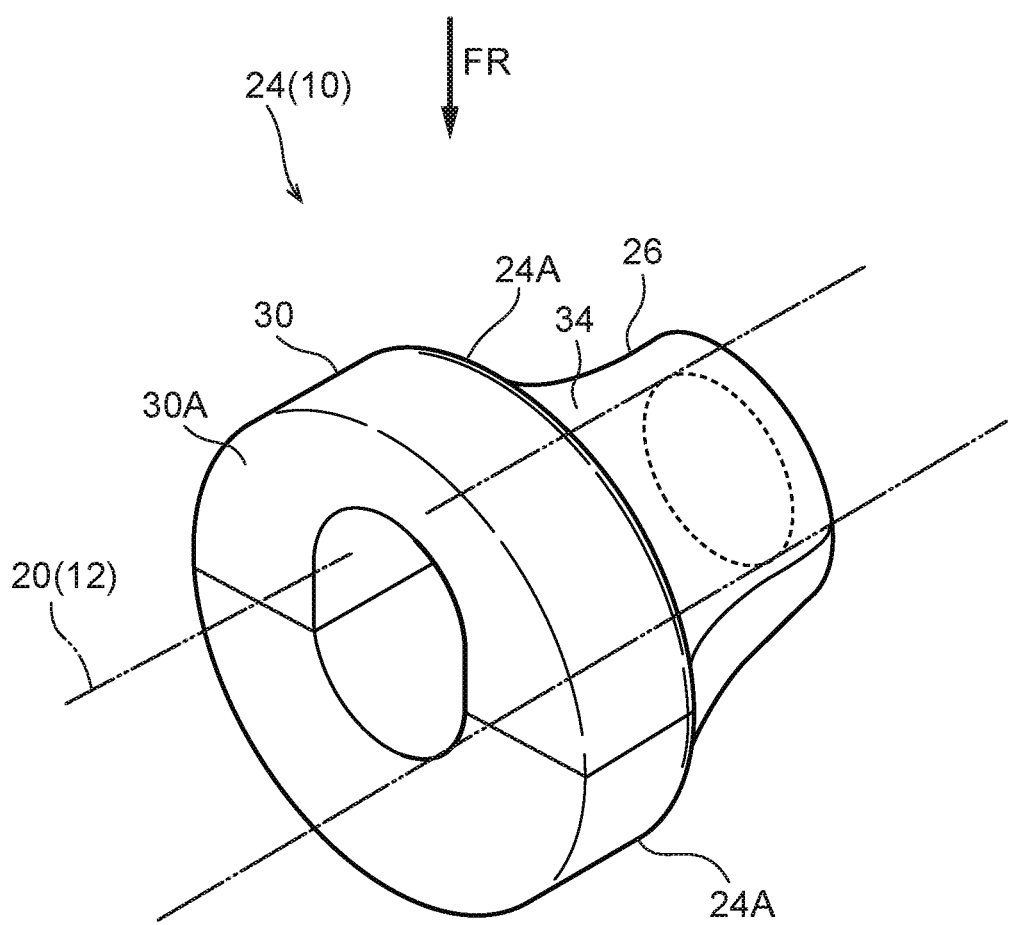
FIG. 3 is a perspective view illustrating a piece of a steering wheel according to the first exemplary embodiment of the present disclosure.
Figure 4:
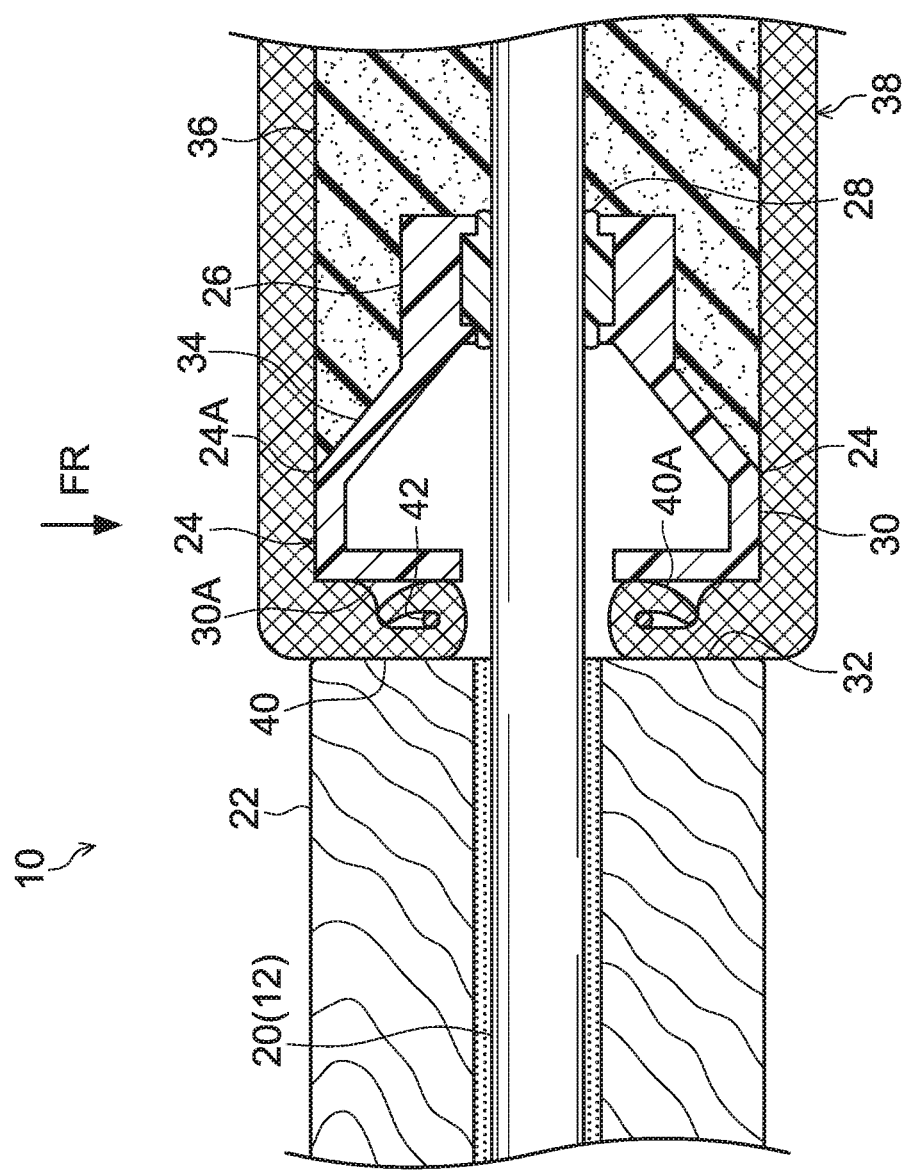
FIG. 4 is a cross-section (a cross-section along line 4-4 in FIG. 1) illustrating relevant portions of a steering wheel according to the first exemplary embodiment of the present disclosure.

As illustrated in FIGS. 2 to 4, substantially circular tube shaped pieces 24, serving as placement members, are respectively provided at the rim section 20 at either length direction side of each wood member 22. The pieces 24 are made of hard resin (such as ABS resin), and have a high rigidity. Each piece 24 is configured by substantially semi-circular tube shaped configuration bodies 24A at the vehicle front side and vehicle rear side, respectively. The pairs of configuration bodies 24A are fixed (adhered in the present exemplary embodiment) together, and the pieces 24 cover the entire circumference of, and along the extension direction of, the rim section 20.

A substantially circular tube shaped small diameter portion 26, serving as an attachment portion, is provided at a portion of each piece 24 at the opposite side to the wood member 22. An inner peripheral face of the small diameter portion 26 is fixed (adhered) to an outer peripheral face of the rim section 20 by adhesive 28, serving as a fixing means, such that the respective piece 24 is attached to the rim section 20 at the small diameter portion 26. The adhesive 28 has a large adhesive force, and the small diameter portion 26 is fixed to the rim section 20 by the adhesive 28 with a high strength.

A substantially circular tube shaped large diameter portion 30, serving as a facing portion, is provided at a portion at the wood member 22 side of each piece 24, and the large diameter portion 30 has a larger external diameter than the small diameter portion 26. The large diameter portion 30 has a smaller thickness dimension than the small diameter portion 26, and the large diameter portion 30 has a lower strength than the small diameter portion 26. An annular plate shaped end wall 30A is provided at an end at the wood member 22 side of each large diameter portion 30. The end wall 30A and a face at the piece 24 (large diameter portion 30) side of each wood member 22 face each other in a state disposed parallel to each other, with a gap 32 formed therebetween.

A step portion 34, serving as a coupling portion, is provided at a portion of each piece 24 between the small diameter portion 26 and the large diameter portion 30. The step portion 34 has an external diameter that gradually increases (and may be formed in an annular plate shape) on progression from the small diameter portion 26 side toward the large diameter portion 30 side, and couples the small diameter portion 26 and the large diameter portion 30 together. The step portion 34 has a smaller thickness dimension than the small diameter portion 26, and the step portion 34 has a lower strength than the small diameter portion 26.

As illustrated in FIGS. 2 and 4, an inner member 36, which is substantially T-shaped in face-on view and serves as a resin body, is provided between the respective extension portion 18A of each spoke section 18, and the respective pair of pieces 24 that are interposed between the inner member 36 and the wood members 22. The inner member 36 is made of soft resin (such as polyurethane), and has a lower rigidity than the pieces 24.

The inner member 36 extends to the extension portion 18A of the respective spoke section 18. The inner member 36 is fixed to the spoke section 18 and the extension portion 18A, covers the entire circumference of, and along the extension direction of, the spoke section 18, and has an outer peripheral face that is in the same plane as an outer peripheral face of the extension portion 18A. The inner member 36 is also fixed to the rim section 20 between the respective pair of pieces 24. The inner member 36 is curved so as to extend along the extension direction of the rim section 20, and covers the entire circumference of, and along the extension direction of, the rim section 20. The inner member 36 also extends to the small diameter portions 26 and the step portions 34 of the respective pieces 24. The inner member 36 is fixed to the small diameter portions 26 and the step portions 34, covers the entire circumferential direction of the small diameter portions 26 and of the step portions 34, and has its outer peripheral face in the same plane as outer peripheral faces of the large diameter portions 30 of the pieces 24. The inner member 36 is provided by molding resin, and the resin is deburred at a boundary position between the large diameter portion 30 and the step portion 34 of each piece 24 when forming the inner member 36.

As illustrated in FIGS. 1 and 4, the inner members 36, and the large diameter portions 30 of the pairs of pieces 24 between the extension portions 18A of the spoke sections 18 and the wood members 22, are covered by leather pieces 38, serving as covering material. The two end portions of each leather piece 38, in the extension direction of the inner member 36, are each joined to itself around the circumference by stitching, for example.

Insertion portions 40 are respectively provided at an end portion at the spoke section 18 side of each leather piece 38, and at end portions at the wood member 22 sides of each leather piece 38. The insertion portions 40 are inserted further toward the boss section 14 side than the extension portion 18A of the spoke section 18, and are also inserted into the gaps 32 between the wood members 22 and the pieces 24. A tube portion 40A is formed at each insertion portion 40 by stitching together in a folded-back state, for example, and an elongated thread 42, serving as a cord body, is inserted through the tube portion 40A.

The insertion portion 40 and the thread 42 that are further toward the boss section 14 side than the extension portion 18A of the spoke section 18 are disposed in the periphery of the spoke section 18, and both end portions of the thread 42 are joined together, such that the insertion portion 40 at the spoke section 18 side of the leather piece 38 is fixed to the periphery of the spoke section 18. The insertion portions 40 and the threads 42 that are in the respective gaps 32 between the wood members 22 and the pieces 24 are disposed at the periphery of the rim section 20, and both end portions of the respective threads 42 are joined together, such that the insertion portions 40 at the wood member 22 sides of the leather piece 38 are fixed to the periphery of the rim section 20. The leather pieces 38 are heat treated and compressed, such that a tensile force acts on the leather pieces 38. The large diameter portion 30 and the step portion 34 of each piece 24 have sufficient strength not to be deformed by the tensile force acting on the leather piece 38.

Explanation follows regarding operation of the present exemplary embodiment.

In the steering wheel 10 with the above configuration, the pieces 24 are disposed between the wood members 22 and the inner members 36, and the insertion portions 40 of the leather pieces 38 are inserted into the gaps 32 between the wood members 22 and the pieces 24 (large diameter portions 30).

Figure 7A:
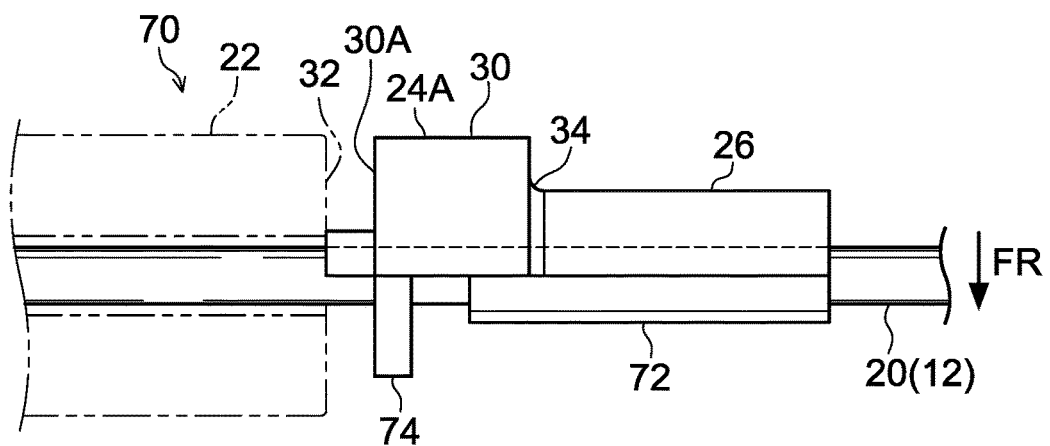
FIG. 7A is a cross-section (a cross-section along the position of line 4-4 in FIG. 1) illustrating relevant portions of a steering wheel according to a fourth exemplary embodiment of the present disclosure in a partially assembled state.
Figure 7B:
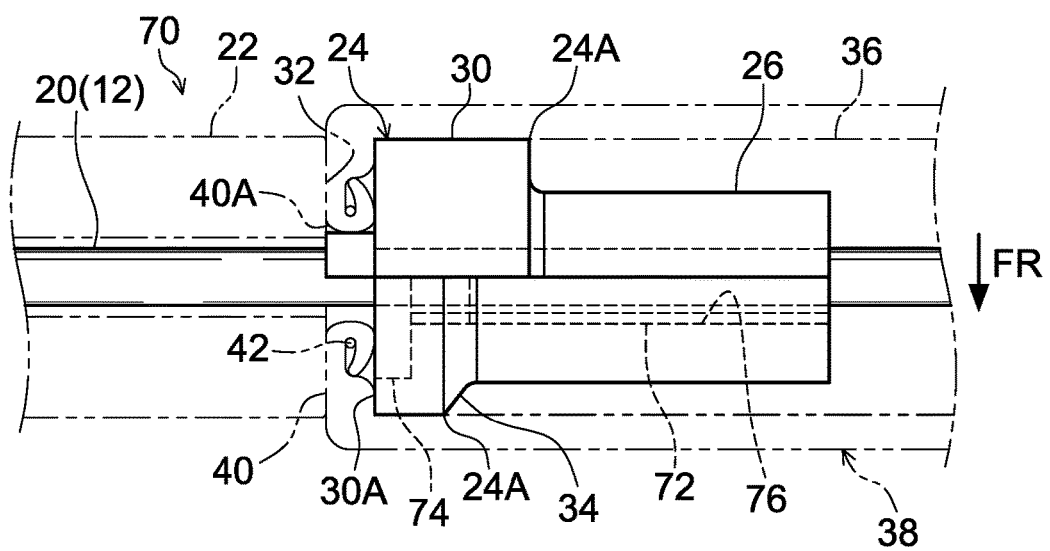
FIG. 7B is a cross-section (a cross-section along the position of line 4-4 in FIG. 1) illustrating relevant portions of a steering wheel according to the fourth exemplary embodiment of the present disclosure in an assembled state.
Figure 7C:
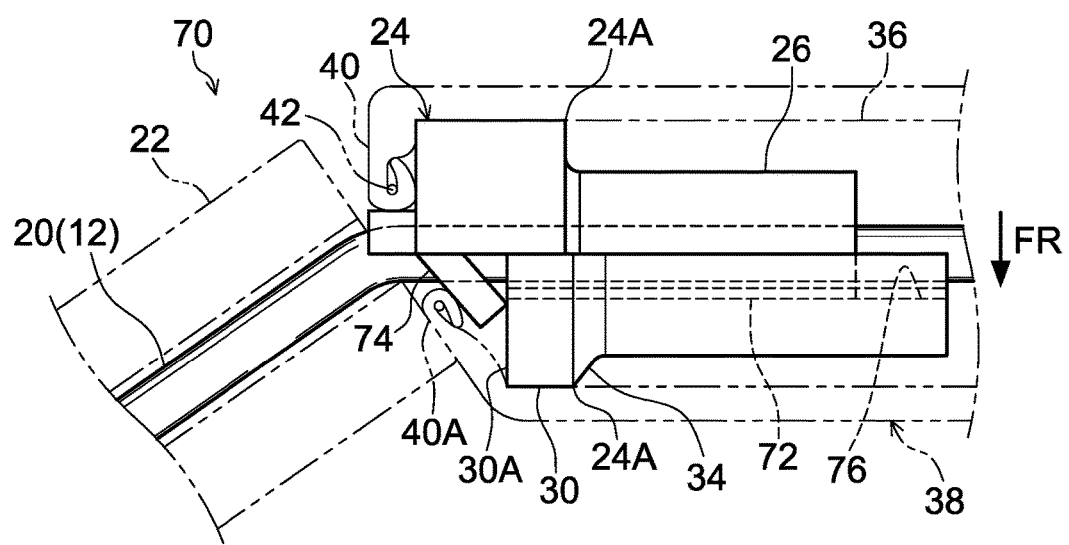
FIG. 7C is a cross-section (a cross-section along the position of line 4-4 in FIG. 1) illustrating relevant portions of a steering wheel according to the fourth exemplary embodiment of the present disclosure during tilting of a wooden member.

In a vehicle emergency (such as a collision), there is a possibility that the occupant impinges on one of the wood members 22 from the vehicle rear side, and load (impact) toward the vehicle front side has been input to the wood member 22 from the occupant, such that the rim section 20 of the metal core 12 undergoes bending deformation between the wood member 22 and the piece 24, and the wood member 22 is tilted (displaced) toward the vehicle front side with respect to the piece 24 (see FIG. 7C).

Note that in each piece 24, the large diameter portion 30 and the step portion 34 have a smaller thickness dimension and a lower strength than the small diameter portion 26. Thus, when the wood member 22 is tilted toward the vehicle front side with respect to the piece 24, and load (impact) has been input from a vehicle front side portion of the wood member 22 to a vehicle front side portion (a portion at the opposite side to the occupant) of the piece 24 through the insertion portion 40 of the leather piece 38, vehicle front side portions of the large diameter portion 30 and the step portion 34 (portions of the vehicle front side configuration body 24A) are deformed while separating from a vehicle rear side portion of the piece 24, and are moved toward the inner member 36 side, by the wood member 22. This enables load input to the wood member 22 from the piece 24 to be reduced, and enables damage to the wood member 22 by the piece 24 to be suppressed.

As described above, the large diameter portion 30 and the step portion 34 are deformed and moved by the wood member 22. Thus, the large diameter portion 30 and the step portion 34 can be moved by the wood member 22 simply by lowering the strength of the large diameter portion 30 and the step portion 34 to facilitate deformation of the large diameter portion 30 and the step portion 34, enabling the large diameter portion 30 and the step portion 34 to be moved using a simple configuration.

The vehicle front side portions of the large diameter portion 30 and the step portion 34 have a low strength. Thus, as described above, even when load has been input from the vehicle front side portion of the wood member 22 to the vehicle front side portion of the piece 24, damage to the wood member 22 by the piece 24 can be suppressed due to the vehicle front side portions of the large diameter portion 30 and the step portion 34 being moved toward the inner member 36 side by the vehicle front side portion of the wood member 22.

Note that in the present exemplary embodiment, the vehicle front side portions and vehicle rear side portions of the large diameter portion 30 and the step portion 34 have a low strength. However, configuration may be such that only the vehicle front side portions of the large diameter portion 30 and the step portion 34 have a low strength.

In the present exemplary embodiment, the large diameter portion 30 and the step portion 34 have a low strength. However, configuration may be such that only the large diameter portion 30, or only the step portion 34, has a low strength.

Second Exemplary Embodiment

FIG. 5 is a cross-section (a cross-section at the position of line 4-4 in FIG. 1) illustrating relevant portions of a steering wheel 50 according to a second exemplary embodiment of the present disclosure.

The steering wheel 50 according to the present exemplary embodiment has substantially the same configuration as the first exemplary embodiment, with the exception of the following points.

As illustrated in FIG. 5, in the steering wheel 50 according to the present exemplary embodiment, the inner peripheral face of the small diameter portion 26 of each piece 24 is fixed (adhered) to an outer peripheral face of the rim section 20 of the metal core 12 by adhesive 52, serving as a fixing means, such that the piece 24 is attached to the rim section 20 at the small diameter portion 26. The adhesive 52 has a lower rigidity and a lower adhesive force after drying than the adhesive 28 of the first exemplary embodiment, and the fixing strength of the small diameter portion 26 to the rim section 20 is lower than that in the first exemplary embodiment. The small diameter portion 26 is fixed to the rim section 20 by the adhesive 52 with sufficient strength not to be released under the tensile force acting on the leather piece 38.

In each piece 24, the large diameter portion 30 and the step portion 34 have substantially the same thickness dimension and substantially the same strength as the small diameter portion 26.

Note that, as described above, the adhesive 52 has a low adhesive force, and the fixing strength of the small diameter portion 26 to the rim section 20 by the adhesive 52 is low. Thus, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to a vehicle front side portion (the portion at the opposite side to the occupant) of the piece 24 through the insertion portion 40 of the leather piece 38, the small diameter portion 26 is released from being fixed to the rim section 20, while the vehicle front side portion of the piece 24 (the vehicle front side configuration body 24A) separates from the vehicle rear side portion of the piece 24 (the vehicle rear side configuration body 24A) and is moved toward the inner member 36 side, by the wood member 22. This enables load input to the wood member 22 from the piece 24 to be reduced, and enables damage to the wood member 22 by the piece 24 to be suppressed.

The small diameter portion 26 is released from being fixed to the rim section 20 by the adhesive 52, and the piece 24 is moved, by the wood member 22. Thus, the piece 24 can be moved by the wood member 22 simply by lowering the adhesive strength of the adhesive 52 and lowering the fixing strength of the small diameter portion 26 to the rim section 20, enabling the piece 24 to be moved using a simple configuration.

The fixing strength of a vehicle front side portion of the small diameter portion 26 to the rim section 20 is low. Thus, as described above, even when load has been input from the vehicle front side portion of the wood member 22 to the vehicle front side portion of the piece 24, damage to the wood member 22 by the piece 24 can be suppressed due to the vehicle front side portion of the small diameter portion 26 being released from being fixed to the rim section 20 by the vehicle front side portion of the wood member 22.

Note that in the present exemplary embodiment, the fixing strength of the vehicle front side portion and a vehicle rear side portion of the small diameter portion 26 to the rim section 20 is low. However, configuration may be such that only the fixing strength of the vehicle front side portion of the small diameter portion 26 to the rim section 20 is low.

Third Exemplary Embodiment

FIG. 6 is a cross-section (a cross-section at the position of line 4-4 in FIG. 1) illustrating relevant portions of a steering wheel 60 according to a third exemplary embodiment of the present disclosure.

The steering wheel 60 according to the present exemplary embodiment has substantially the same configuration as the first exemplary embodiment, with the exception of the following points.

As illustrated in FIG. 6, in the steering wheel 60 according to the present exemplary embodiment, plural ribs 26A, serving as a fixing means, are formed at the inner peripheral face of the small diameter portion 26 of each piece 24. The plural ribs 26A each extend about the entire circumferential direction of the small diameter portion 26, and are in a row along the axial direction of the small diameter portion 26. Each rib 26A has a triangular shaped cross-section, and the ribs 26A are in press-contact with the outer peripheral face of the rim section 20 of the metal core 12, such that their leading ends are squashed. The small diameter portion 26 is thereby fixed to the rim section 20 by the plural ribs 26A, the piece 24 is attached to the rim section 20 at the small diameter portion 26, and the fixing strength of the small diameter portion 26 to the rim section 20 is lower than that in the first exemplary embodiment. The small diameter portion 26 is fixed to the rim section 20 by the ribs 26A with sufficient strength not to be released under the tensile force acting on the leather piece 38.

In each piece 24, the large diameter portion 30 and the step portion 34 have substantially the same thickness dimension and substantially the same strength as the small diameter portion 26.

Note that, as described above, the small diameter portion 26 of each piece 24 is fixed to the rim section 20 by the ribs 26A, and the fixing strength of the small diameter portion 26 to the rim section 20 is low. Thus, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the small diameter portion 26 is released from being fixed to the rim section 20, while the vehicle front side portion of the piece 24 (the vehicle front side configuration body 24A) separates from the vehicle rear side portion of the piece 24 (the vehicle rear side configuration body 24A) and is moved toward the inner member 36 side, by the wood member 22. This enables load input to the wood member 22 from the piece 24 to be reduced, and enables damage to the wood member 22 by the piece 24 to be suppressed.

The small diameter portion 26 is released from being fixed by the ribs 26A to the rim section 20, and the piece 24 is moved, by the wood member 22. Thus, the piece 24 can be moved by the wood member 22 simply by fixing the small diameter portion 26 to the rim section 20 using the ribs 26A and lowering the fixing strength of the small diameter portion 26 to the rim section 20, enabling the piece 24 to be moved using a simple configuration.

The fixing strength of the vehicle front side portion of the small diameter portion 26 to the rim section 20 is low. Thus, as described above, even when load has been input from the vehicle front side portion of the wood member 22 to the vehicle front side portion of the piece 24, damage to the wood member 22 by the piece 24 can be suppressed due to the vehicle front side portion of the piece 24 being moved toward the inner member 36 side by the vehicle front side portion of the wood member 22.

Note that in the present exemplary embodiment, the fixing strength of the vehicle front side portion and the vehicle rear side portion of the small diameter portion 26 to the rim section 20 is low. However, configuration may be such that only the fixing strength of the vehicle front side portion of the small diameter portion 26 to the rim section 20 is low.

Fourth Exemplary Embodiment

FIG. 7B is a cross-section (a cross-section at the position of line 4-4 in FIG. 1) illustrating relevant portions of a steering wheel 70 according to a fourth exemplary embodiment of the present disclosure.

The steering wheel 70 according to the present exemplary embodiment has substantially the same configuration as the first exemplary embodiment, with the exception of the following points.

As illustrated in FIG. 7B, in the steering wheel 70 according to the present exemplary embodiment, a pair of attachment protruding portions 72 (see FIG. 7A) with an L-shaped cross-section and configuring an attachment means, are integrally provided at the vehicle rear side portion of each piece 24 (the vehicle rear side configuration body 24A). The attachment protruding portions 72 extend parallel to the axial direction of the piece 24. Each attachment protruding portion 72 projects out toward the vehicle front side, and a leading end side portion of the attachment protruding portion 72 projects out toward the radial direction outside of the piece 24. A column shaped stopper 74 (see FIG. 7A) is integrally provided at the vehicle rear side portion of the piece 24 at an end portion at the wood member 22 side, and the stopper 74 projects out toward the vehicle front side.

A pair of attachment recessed portions 76, each with an L-shaped cross-section and serving as an attachment portion configuring the attachment means, are integrally provided at the vehicle front side portion of each piece 24 (the vehicle front side configuration body 24A). The attachment recessed portions 76 are open inside the piece 24, extend parallel to the axial direction of the piece 24, and are open at both axial direction sides of the piece 24.

The leading end side portions of the attachment protruding portions 72 are inserted into the respective attachment recessed portions 76 from the wood member 22 side. The vehicle front side portion of the piece 24 is abutted from the opposite side to the wood member 22 by the stopper 74, and is anchored against moving (sliding) toward the wood member 22 side. The vehicle front side portion of the piece 24 is thereby attached to the vehicle rear side portion of the piece 24 by the attachment protruding portions 72 and the attachment recessed portions 76, and the stopper 74 is housed inside the vehicle front side portion of the piece 24. The vehicle front side portion of the piece 24 is not fixed to the vehicle rear side portion of the piece 24 or to the rim section 20.

In each piece 24, the large diameter portion 30 and the step portion 34 have substantially the same thickness dimension and substantially the same strength as the small diameter portion 26.

Note that the vehicle front side portion of the piece 24 is guided along the attachment protruding portions 72 through the attachment recessed portions 76, and is capable of moving toward the inner member 36 side. Thus, as illustrated in FIG. 7C, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the vehicle front side portion of the piece 24 (the vehicle front side configuration body 24A) is moved toward the inner member 36 side with respect to the vehicle rear side portion of the piece 24 (the vehicle rear side configuration body 24A), while the stopper 74 undergoes tilting deformation toward the inner member 36 side, by the wood member 22. This enables load input to the wood member 22 from the piece 24 to be reduced, and enables damage to the wood member 22 by the piece 24 to be suppressed.

The attachment recessed portions 76 are moved with respect to the attachment protruding portions 72, and the piece 24 is moved, by the wood member 22. Thus, the piece 24 can be moved by the wood member 22 simply by respectively providing the attachment protruding portions 72 and the attachment recessed portions 76 to the vehicle rear side portion and the vehicle front side portion of the piece 24, enabling the piece 24 to be moved using a simple configuration.

The vehicle front side portion of the piece 24 is capable of moving. Thus, as described above, even when load has been input from the vehicle front side portion of the wood member 22 to the vehicle front side portion of the piece 24, damage to the wood member 22 by the piece 24 can be suppressed due to the vehicle front side portion of the piece 24 being moved toward the inner member 36 side by the vehicle front side portion of the wood member 22.

Fifth Exemplary Embodiment

Figure 8A:
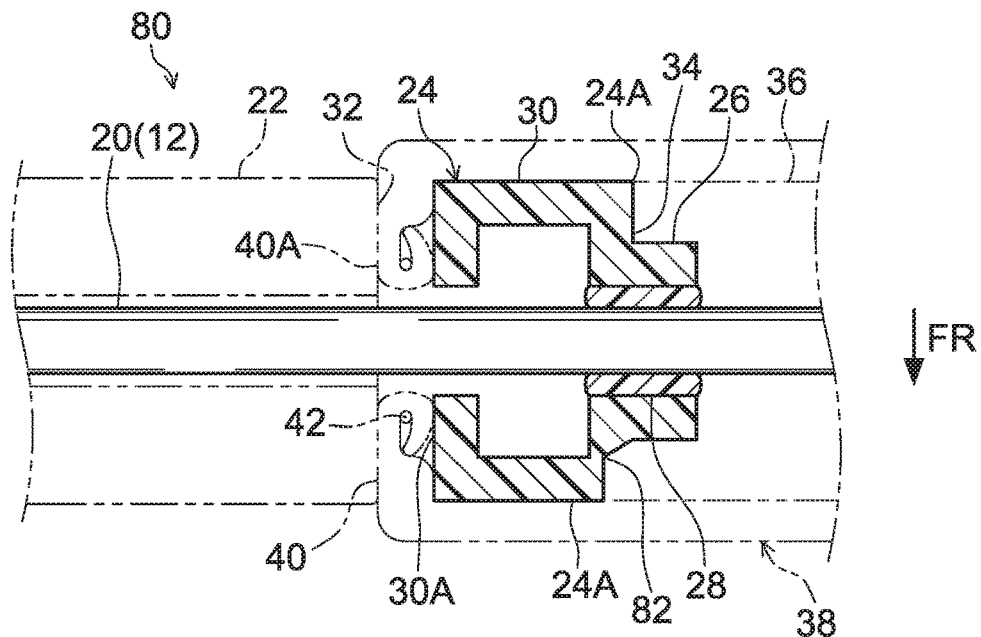
FIG. 8A is a cross-section (a cross-section along the position of line 4-4 in FIG. 1) illustrating relevant portions of a steering wheel according to a fifth exemplary embodiment of the present disclosure in an assembled state.

FIG. 8A is a cross-section (a cross-section at the position of line 4-4 in FIG. 1) illustrating relevant portions of a steering wheel 80 according to a fifth exemplary embodiment of the present disclosure.

The steering wheel 80 according to the present exemplary embodiment has substantially the same configuration as the first exemplary embodiment, with the exception of the following points.

As illustrated in FIG. 8A, in the steering wheel 80 according to the present exemplary embodiment, a thinned portion 82, serving as a low strength portion, is provided at the vehicle front side portion of the piece 24 (the vehicle front side configuration body 24A) at a boundary portion between the step portion 34 and the large diameter portion 30. The thickness dimension of the step portion 34 gradually decreases on progression from the small diameter portion 26 side toward the thinned portion 82. The thinned portion 82 thereby has a smaller thickness dimension and a lower strength than portions of the step portion 34 other than the thinned portion 82. The thinned portion 82 has sufficient strength not to break under the tensile force acting on the leather piece 38.

In each piece 24, the large diameter portion 30 and the step portion 34 have substantially the same thickness dimension and substantially the same strength as the small diameter portion 26.

Figure 8B:
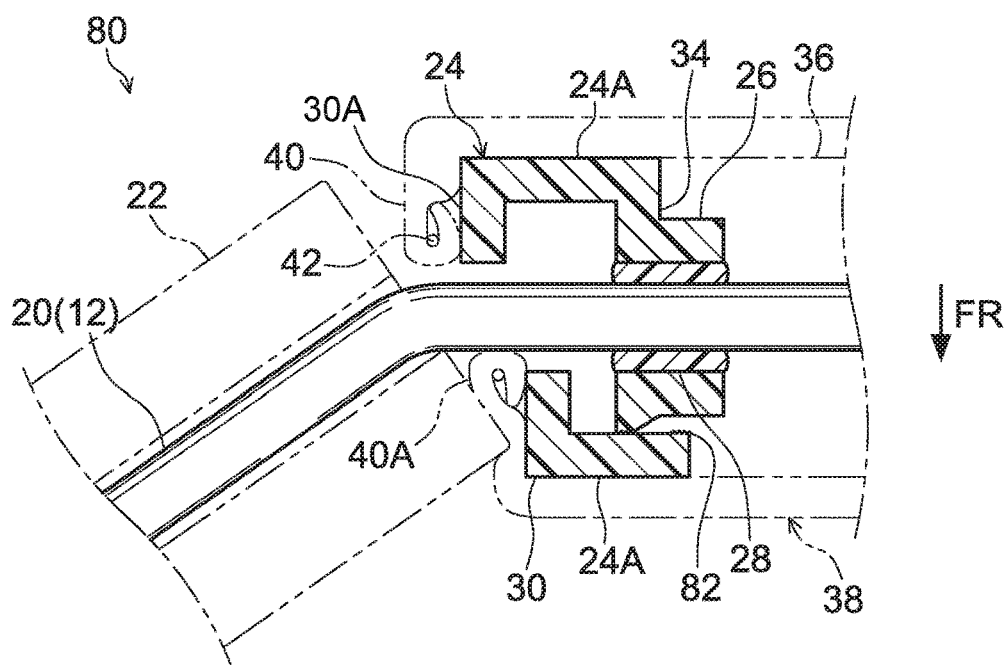
FIG. 8B is a cross-section (a cross-section along the position of line 4-4 in FIG. 1) illustrating relevant portions of a steering wheel according to the fifth exemplary embodiment of the present disclosure during tilting of a wooden member.

Thus, as illustrated in FIG. 8B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the thinned portion 82 of the piece 24 is broken, while the vehicle front side portion of the large diameter portion 30 (a portion of the vehicle front side configuration body 24A) separates from the vehicle rear side portion of the piece 24 (the vehicle rear side configuration body 24A) and is moved toward the inner member 36 side, by the wood member 22. This enables load input to the wood member 22 from the piece 24 to be reduced, and enables damage to the wood member 22 by the piece 24 to be suppressed.

The thinned portion 82 is broken, and the large diameter portion 30 is moved, by the wood member 22. Thus, the large diameter portion 30 can be moved by the wood member 22 simply by providing the thinned portion 82 to the piece 24, enabling the large diameter portion 30 to be moved using a simple configuration.

The vehicle front side portion of the large diameter portion 30 is capable of moving. Thus, as described above, even when load has been input from the vehicle front side portion of the wood member 22 to the vehicle front side portion of the piece 24, damage to the wood member 22 by the piece 24 can be suppressed due to the vehicle front side portion of the large diameter portion 30 being moved toward the inner member 36 side by the vehicle front side portion of the wood member 22.

Moreover, only an outer peripheral portion of the large diameter portion 30 (an outer peripheral end portion of the piece 24) moved by the wood member 22 presses the inner member 36. This enables the movement of the large diameter portion 30 by the wood member 22 to be suppressed from being impeded by the inner member 36, and enables damage to the wood member 22 by the piece 24 to be effectively suppressed.

In the present exemplary embodiment, the thinned portion 82 is only provided at the vehicle front side portion of the piece 24. However, the thinned portion 82 may be provided at both the vehicle front side portion and the vehicle rear side portion of the piece 24.

Sixth Exemplary Embodiment

Figure 9A:
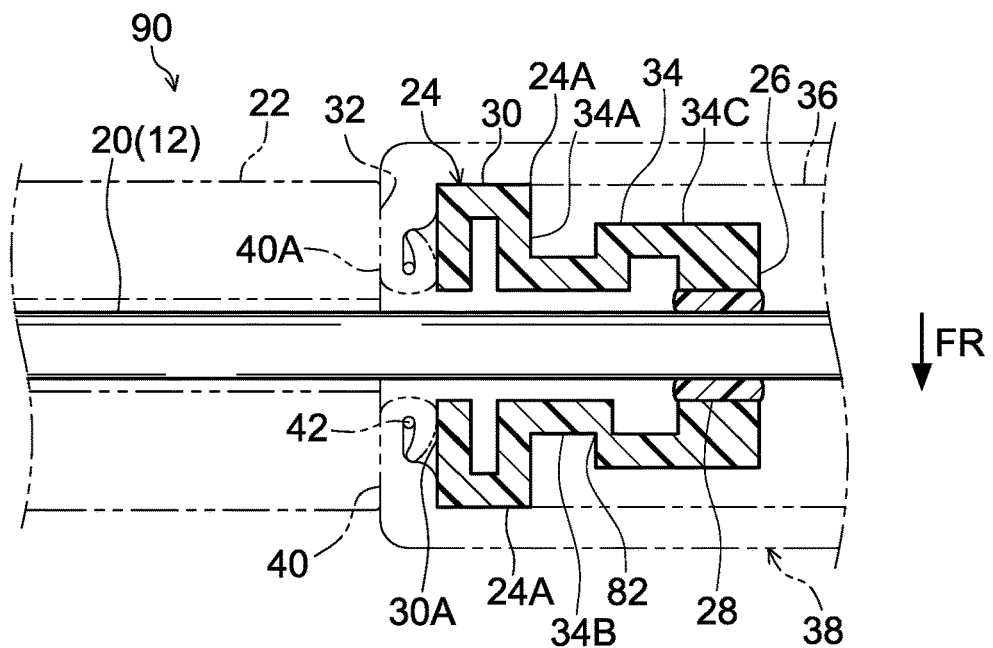
FIG. 9A is a cross-section (a cross-section along the position of line 4-4 in FIG. 1) illustrating relevant portions of a steering wheel according to a sixth exemplary embodiment of the present disclosure in an assembled state.

FIG. 9A is a cross-section (a cross-section at the position of line 4-4 in FIG. 1) illustrating relevant portions of a steering wheel 90 according to a sixth exemplary embodiment of the present disclosure.

The steering wheel 90 according to the present exemplary embodiment has substantially the same configuration as the first exemplary embodiment, with the exception of the following points.

As illustrated in FIG. 9A, in the steering wheel 90 according to the present exemplary embodiment, annular plate shaped first step portion 34A, a circular tube shaped second step portion 34B, and a circular tube shaped third step portion 34C are provided at the step portion 34 of the piece 24, on progression from the large diameter portion 30 side toward the small diameter portion 26 side. The large diameter portion 30 is coupled to an outer periphery of the first step portion 34A, and the second step portion 34B is coupled to an inner peripheral side end portion of the first step portion 34A. The third step portion 34C is coupled to an outer periphery of the second step portion 34B, and the third step portion 34C is coupled to the entire outer periphery of the small diameter portion 26.

The thinned portion 82, serving as a low strength portion, is provided at the vehicle front side portion of the step portion 34 (a portion of the vehicle front side configuration body 24A), at a boundary portion between the second step portion 34B and the third step portion 34C. The thinned portion 82 has a smaller thickness dimension and a lower strength than other portions of the step portion 34. The thinned portion 82 has sufficient strength not to break under the tensile force acting on the leather piece 38.

In each piece 24, excluding the thinned portion 82, the large diameter portion 30 and the step portion 34 have substantially the same thickness dimension and substantially the same strength as the small diameter portion 26.

Figure 9B:
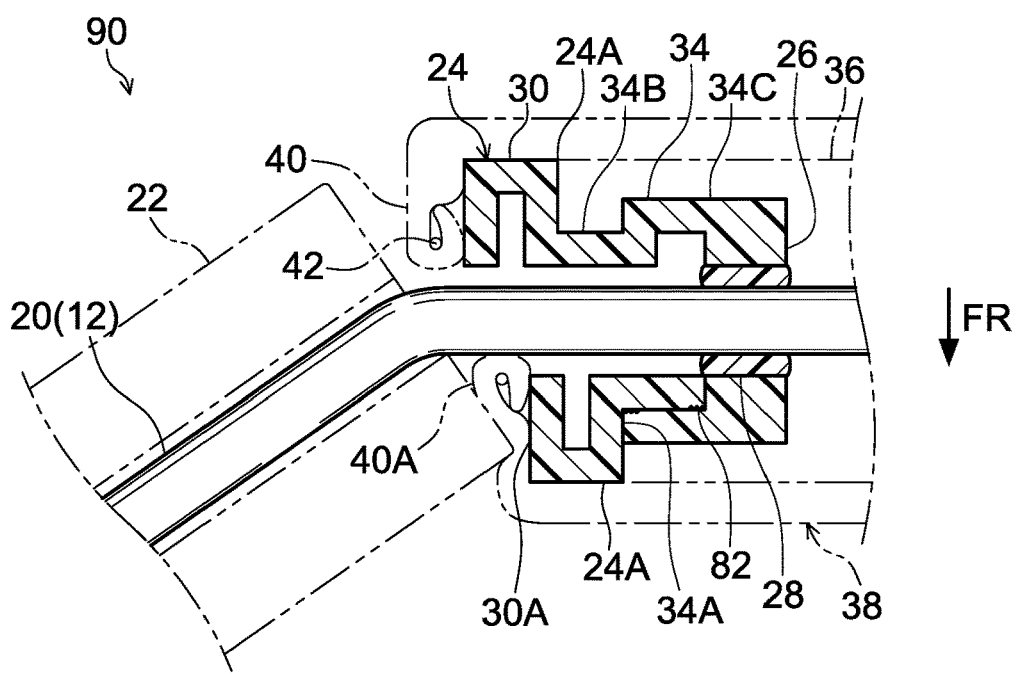
FIG. 9B is a cross-section (a cross-section along the position of line 4-4 in FIG. 1) illustrating relevant portions of a steering wheel according to the sixth exemplary embodiment of the present disclosure during tilting of a wooden member.

Thus, as illustrated in FIG. 9B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the thinned portion 82 of the piece 24 is broken, while the vehicle front side portions of the large diameter portion 30, the first step portion 34A, and the second step portion 34B (portions of the vehicle front side configuration body 24A) separate from the vehicle rear side portion of the piece 24 (the vehicle rear side configuration body 24A) and are moved toward the inner member 36 side, by the wood member 22. This enables load input to the wood member 22 from the piece 24 to be reduced, and enables damage to the wood member 22 by the piece 24 to be suppressed.

The thinned portion 82 is broken and the large diameter portion 30, the first step portion 34A, and the second step portion 34B are moved, by the wood member 22. Thus, the large diameter portion 30, the first step portion 34A, and the second step portion 34B can be moved by the wood member 22 simply by providing the thinned portion 82 to the piece 24, enabling the large diameter portion 30, the first step portion 34A, and the second step portion 34B to be moved using a simple configuration.

The vehicle front side portions of the large diameter portion 30, the first step portion 34A, and the second step portion 34B are capable of moving. Thus, as described above, even when load has been input from the vehicle front side portion of the wood member 22 to the vehicle front side portion of the piece 24, damage to the wood member 22 by the piece 24 can be suppressed due to the vehicle front side portions of the large diameter portion 30, the first step portion 34A, and the second step portion 34B being moved toward the inner member 36 side by the vehicle front side portion of the wood member 22.

Note that in the present exemplary embodiment, the thinned portion 82 is only provided at the vehicle front side portion of the piece 24. However, the thinned portion 82 may be provided at both the vehicle front side portion and the vehicle rear side portion of the piece 24.

Seventh Exemplary Embodiment

Figure 10A:
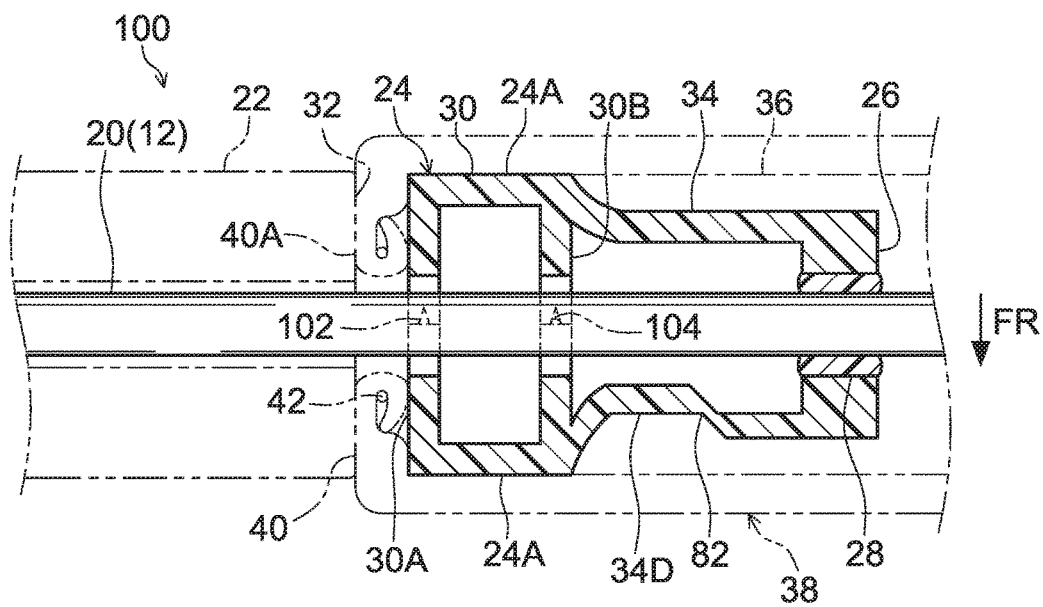
FIG. 10A is a cross-section (a cross-section along the position of line 4-4 in FIG. 1) illustrating relevant portions of a steering wheel according to a seventh exemplary embodiment of the present disclosure in an assembled state.

FIG. 10A is a cross-section (a cross-section at the position of line 4-4 in FIG. 1) illustrating relevant portions of a steering wheel 100 according to a seventh exemplary embodiment of the present disclosure.

The steering wheel 100 according to the present exemplary embodiment has substantially the same configuration as the first exemplary embodiment, with the exception of the following points.

As illustrated in FIG. 10A, in the steering wheel 100 according to the present exemplary embodiment, an annular plate shaped inner wall 30B is provided at the large diameter portion 30 at an opposite side end to the wood member 22 side of the piece 24. The inner wall 30B faces the end wall 30A of the large diameter portion 30 in state disposed parallel thereto. Triangular conical shaped pins 102, configuring an alignment means, are provided at vehicle rear side faces of vehicle front side portions of the end wall 30A and the inner wall 30B (portions of the vehicle front side configuration body 24A), and the pins 102 project out toward the vehicle rear side. Triangular conical shaped pin holes 104, configuring the alignment means, are provided at vehicle front side faces of vehicle rear side portions of the end wall 30A and the inner wall 30B (portions of the vehicle rear side configuration body 24A), and the pin holes 104 are open toward the vehicle front side. The pins 102 are fitted (inserted) into the respective pin holes 104 and their peripheral faces are squashed, such that the positions of the vehicle front side portion and the vehicle rear side portion of the piece 24 are aligned.

When deburring the resin at the boundary position between the large diameter portion 30 and the step portion 34 of the piece 24 when forming the inner member 36, pressure acts on the large diameter portion 30 from the radial direction outside (particularly both vehicle front-rear direction outsides). Note that the pin 102 has sufficient strength not to break under this pressure. The pin 102 also has sufficient strength not to break under the tensile force acting on the leather piece 38.

A portion of the step portion 34 excluding an end portion at the large diameter portion 30 side has a circular tube shape, and the step portion 34 is coupled to the entire outer periphery of the small diameter portion 26. The thinned portion 82, serving as a low strength portion, is provided at the vehicle front side portion of the step portion 34 at an axial direction intermediate portion of the step portion 34.

The thinned portion 82 has a smaller thickness dimension and a lower strength than other portions of the step portion 34. A substantially semicircular tube shaped movement portion 34D is configured to the vehicle front side portion of the step portion 34 further toward the large diameter portion 30 side than the thinned portion 82. An outer peripheral face of a portion of the movement portion 34D excluding an end portion at the large diameter portion 30 side is disposed in a position further to the radial direction inside of an inner peripheral face of a portion at the small diameter portion 26 side than the thinned portion 82 of the step portion 34. The thinned portion 82 also has sufficient strength not to break under the tensile force acting on the leather piece 38.

In each piece 24, excluding the thinned portion 82, the large diameter portion 30 and the step portion 34 have substantially the same thickness dimension and substantially the same strength as the small diameter portion 26.

Figure 10B:
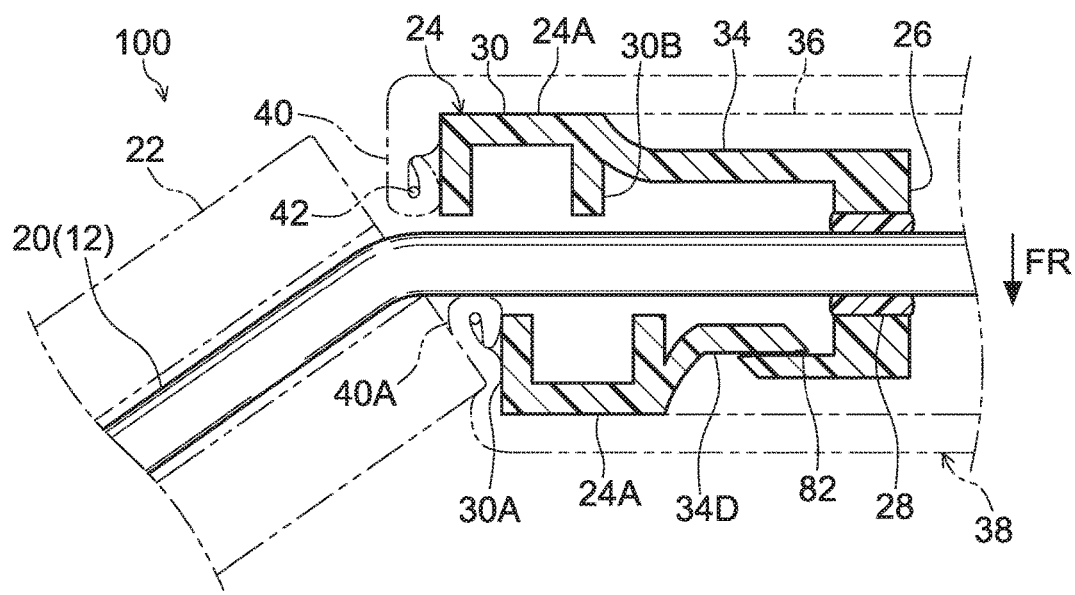
FIG. 10B is a cross-section (a cross-section along the position of line 4-4 in FIG. 1) illustrating relevant portions of a steering wheel according to the seventh exemplary embodiment of the present disclosure during tilting of a wooden member.

Thus, as illustrated in FIG. 10B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the thinned portion 82 and the pin 102 of the piece 24 are broken, while the vehicle front side portion of the large diameter portion 30 and the movement portion 34D (portions of the vehicle front side configuration body 24A) separate from the vehicle rear side portion of the piece 24 (the vehicle rear side configuration body 24A) and are moved toward the inner member 36 side, by the wood member 22. This enables load input to the wood member 22 from the piece 24 to be reduced, and enables damage to the wood member 22 by the piece 24 to be suppressed.

The thinned portion 82 is broken and the large diameter portion 30 and the movement portion 34D are moved by the wood member 22. Thus, the large diameter portion 30 and the movement portion 34D can be moved by the wood member 22 simply by providing the thinned portion 82 to the piece 24, enabling the large diameter portion 30 and the movement portion 34D to be moved using a simple configuration.

The vehicle front side portion of the large diameter portion 30 and the movement portion 34D are capable of moving. Thus, as described above, even when load has been input from the vehicle front side portion of the wood member 22 to the vehicle front side portion of the piece 24, damage to the wood member 22 by the piece 24 can be suppressed due to the vehicle front side portion of the large diameter portion 30 and the movement portion 34D being moved toward the inner member 36 side by the vehicle front side portion of the wood member 22.

Note that in the present exemplary embodiment, the thinned portion 82 and the movement portion 34D are only provided at the vehicle front side portion of the piece 24. However, the thinned portion 82 and the movement portion 34D may be provided at both the vehicle front side portion and the vehicle rear side portion of the piece 24.

Eighth Exemplary Embodiment

Figure 11A:
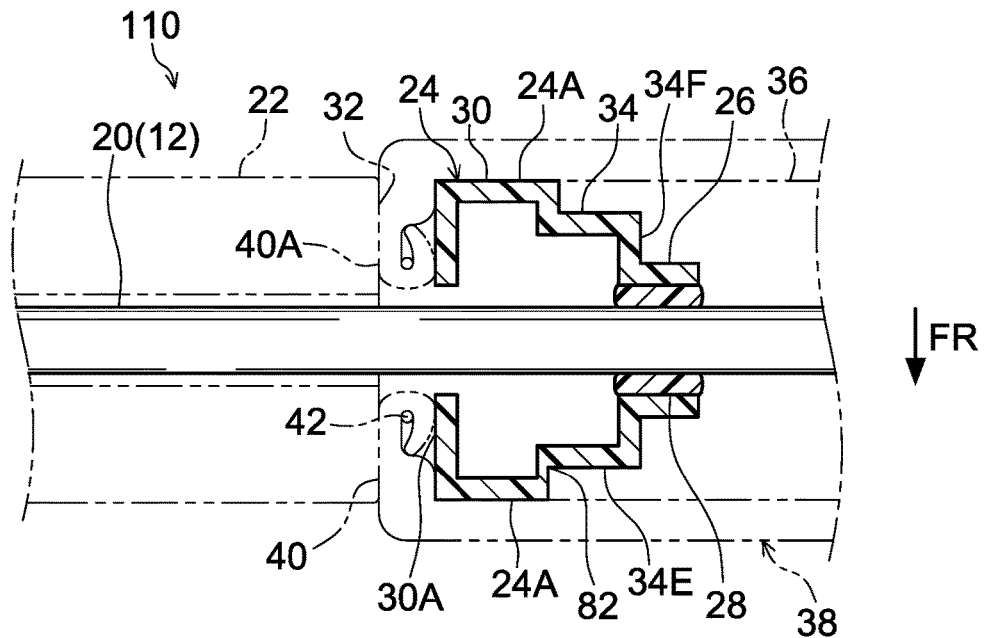
FIG. 11A is a cross-section (a cross-section along the position of line 4-4 in FIG. 1) illustrating relevant portions of a steering wheel according to an eighth exemplary embodiment of the present disclosure in an assembled state.

FIG. 11A is a cross-section (a cross-section at the position of line 4-4 in FIG. 1) illustrating relevant portions of a steering wheel 110 according to an eighth exemplary embodiment of the present disclosure.

The steering wheel 110 according to the present exemplary embodiment has substantially the same configuration as the first exemplary embodiment, with the exception of the following points.

As illustrated in FIG. 11A, in the steering wheel 110 according to the present exemplary embodiment, a circular tube shaped fourth step portion 34E and an annular plate shaped fifth step portion 34F are provided at the step portion 34 of the piece 24, on progression from the large diameter portion 30 side toward the small diameter portion 26 side. The large diameter portion 30 is coupled to an outer periphery of the fourth step portion 34E, the fourth step portion 34E is coupled to an outer periphery of the fifth step portion 34F, and the small diameter portion 26 is coupled to an inner periphery of the fifth step portion 34F. The thinned portion 82, serving as a low strength portion, is provided at the vehicle front side portion of the step portion 34 at a connection portion between the large diameter portion 30 and the fourth step portion 34E. The thinned portion 82 has a smaller thickness dimension and a lower strength than other portions of the step portion 34. The thinned portion 82 has sufficient strength not to break under the tensile force acting on the leather piece 38.

In each piece 24, excluding the thinned portion 82, the large diameter portion 30 and the step portion 34 have substantially the same thickness dimension and substantially the same strength as the small diameter portion 26.

Figure 11B:
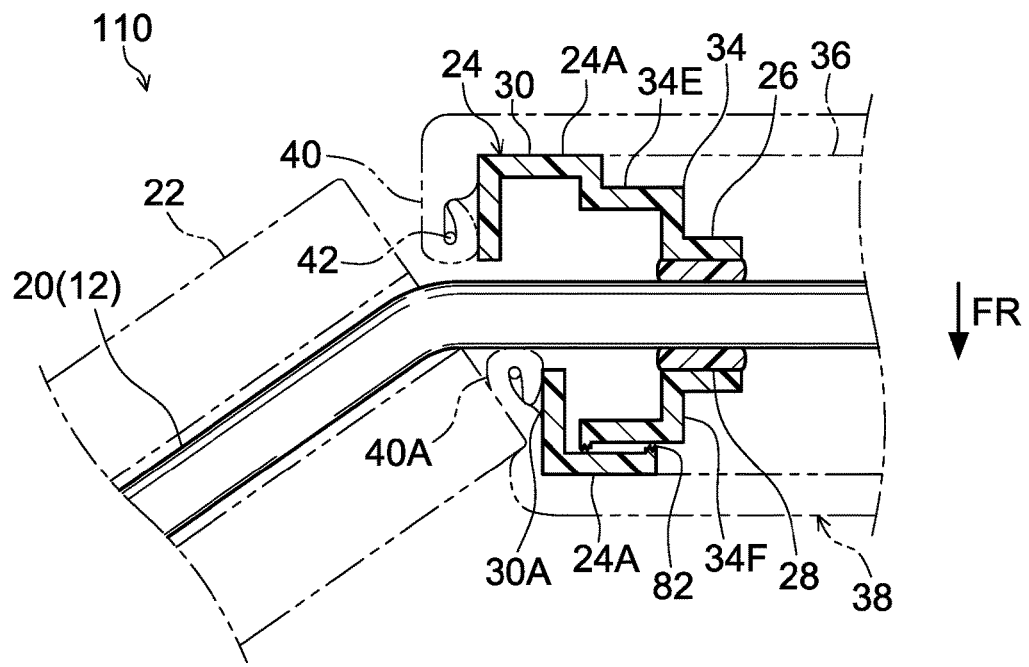
FIG. 11B is a cross-section (a cross-section along the position of line 4-4 in FIG. 1) illustrating relevant portions of a steering wheel according to the eighth exemplary embodiment of the present disclosure during tilting of a wooden member.

Thus, as illustrated in FIG. 11B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the thinned portion 82 of the piece 24 is broken, while the vehicle front side portion of the large diameter portion 30 (a portion of the vehicle front side configuration body 24A) separates from the vehicle rear side portion of the piece 24 (the vehicle rear side configuration body 24A) and is moved toward the inner member 36 side, by the wood member 22. This enables load input to the wood member 22 from the piece 24 to be reduced, and enables damage to the wood member 22 by the piece 24 to be suppressed.

The thinned portion 82 is broken, and the large diameter portion 30 is moved, by the wood member 22. Thus, the large diameter portion 30 can be moved by the wood member 22 simply by providing the thinned portion 82 to the piece 24, enabling the large diameter portion 30 to be moved using a simple configuration.

The vehicle front side portion of the large diameter portion 30 is capable of moving. Thus, as described above, even when load has been input from the vehicle front side portion of the wood member 22 to the vehicle front side portion of the large diameter portion 30, damage to the wood member 22 by the piece 24 can be suppressed due to the vehicle front side portion of the large diameter portion 30 being moved toward the inner member 36 side by the vehicle front side portion of the wood member 22.

Moreover, only the outer peripheral portion of the large diameter portion 30 (the outer peripheral end portion of the piece 24) moved by the wood member 22 presses the inner member 36. This enables the movement of the large diameter portion 30 by the wood member 22 to be suppressed from being impeded by the inner member 36, and enables damage to the wood member 22 by the piece 24 to be effectively suppressed.

Note that in the present exemplary embodiment, the thinned portion 82 is only provided at the vehicle front side portion of the piece 24. However, the thinned portion 82 may be provided at both the vehicle front side portion and the vehicle rear side portion of the piece 24.

Ninth Exemplary Embodiment

Figure 12A:
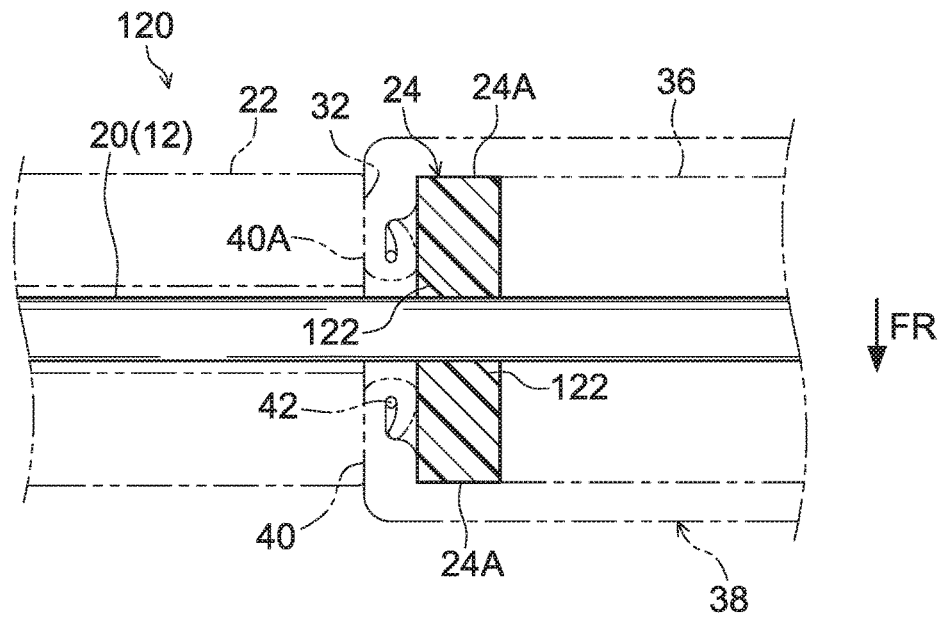
FIG. 12A is a cross-section (a cross-section along the position of line 4-4 in FIG. 1) illustrating relevant portions of a steering wheel according to a ninth exemplary embodiment of the present disclosure in an assembled state.

FIG. 12A is a cross-section (a cross-section at the position of line 4-4 in FIG. 1) illustrating relevant portions of a steering wheel 120 according to a ninth exemplary embodiment of the present disclosure.

The steering wheel 120 according to the present exemplary embodiment has substantially the same configuration as the first exemplary embodiment, with the exception of the following points.

As illustrated in FIG. 12A, in the steering wheel 120 according to the present exemplary embodiment, the piece 24 has an annular plate shape, and the axial direction dimension of the piece 24 is smaller than that in the first exemplary embodiment. An inner peripheral face of the piece 24 is fixed (adhered) to the outer peripheral face of the rim section 20 by adhesive (not illustrated in the drawings), serving as a fixing means, such that the inner peripheral face of the piece 24 is attached to the rim section 20. The fixing strength of the piece 24 to the rim section 20 is low, similarly to that in the second exemplary embodiment, and the piece 24 is fixed to the rim section 20 with sufficient strength not to be released under the tensile force acting on the leather piece 38.

Figure 13:
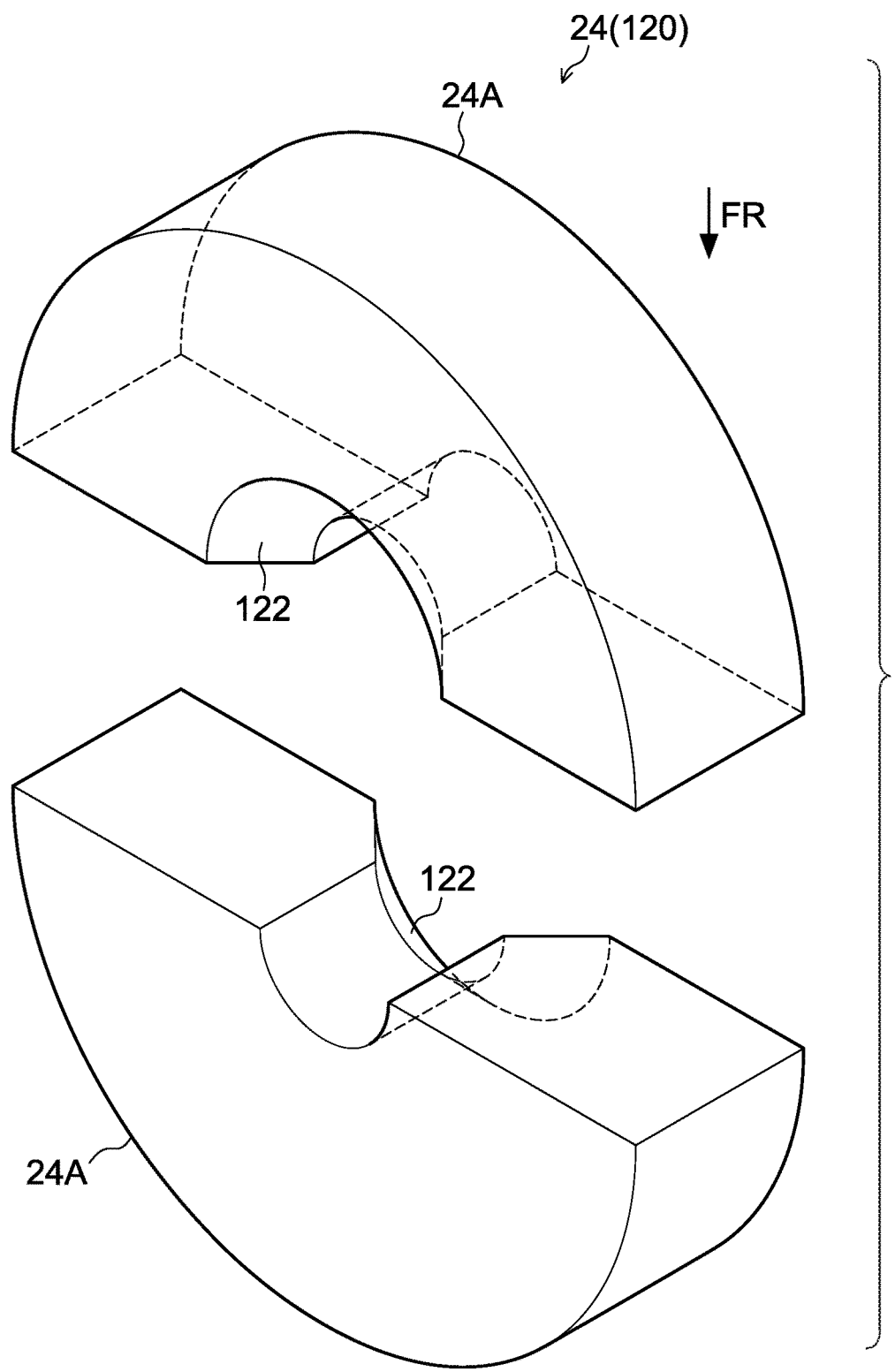
FIG. 13 is an exploded perspective view illustrating a piece of a steering wheel according to the ninth exemplary embodiment of the present disclosure.

As illustrated in detail in FIG. 13, a sloped face 122 is formed at the vehicle front side portion (the vehicle front side configuration body 24A) of the piece 24, at a corner portion at the inner peripheral side and inner member 36 side. The sloped face 122 slopes in a direction toward the radial direction outside of the piece 24 on progression toward the inner member 36 side. A sloped face 122 is similarly formed at the vehicle rear side portion (the vehicle rear side configuration body 24A) of the piece 24, at a corner portion at the inner peripheral side and wood member 22 side. This sloped face 122 slopes in a direction toward the radial direction outside of the piece 24 on progression toward the wood member 22 side.

Figure 12B:
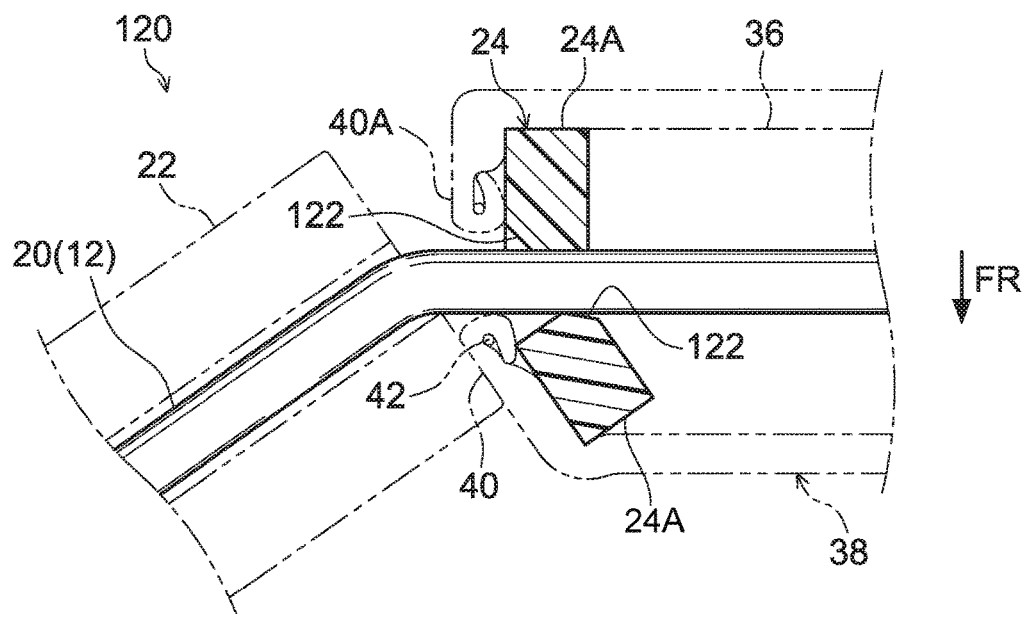
FIG. 12B is a cross-section (a cross-section along the position of line 4-4 in FIG. 1) illustrating relevant portions of a steering wheel according to the ninth exemplary embodiment of the present disclosure during tilting of a wooden member.

Thus, as illustrated in FIG. 12B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, the vehicle front side portion of the piece 24 (the vehicle front side configuration body 24A) is tilted and moved toward the inner member 36 side, while being separated from the vehicle rear side portion of the piece 24 (the vehicle rear side configuration body 24A), by the wood member 22. This enables load input to the wood member 22 from the piece 24 to be reduced, and enables damage to the wood member 22 by the piece 24 to be suppressed.

The piece 24 is tilted and moved by the wood member 22. Thus, the piece 24 can be moved by the wood member 22 simply by making the piece 24 capable of tilting, enabling the piece 24 to be moved using a simple configuration.

The vehicle front side portion of the piece 24 is capable of moving. Thus, as described above, even when load has been input from the vehicle front side portion of the wood member 22 to the vehicle front side portion of the piece 24, damage to the wood member 22 by the piece 24 can be suppressed due to the vehicle front side portion of the piece 24 being moved toward the inner member 36 side by the vehicle front side portion of the wood member 22.

The sloped face 122 is provided at the vehicle front side portion of the piece 24 at the corner portion at the inner peripheral side and inner member 36 side. The sloped face 122 enables the piece 24 to be easily tilted by the wood member 22, enabling damage to the wood member 22 by the piece 24 to be effectively suppressed.

In the present exemplary embodiment, the sloped faces 122 are provided at both the vehicle front side portion and the vehicle rear side portion of the piece 24. However, configuration may be such that the sloped face 122 is only provided at the vehicle front side portion of the piece 24.

In the first exemplary embodiment to the third exemplary embodiment and the fifth exemplary embodiment to the ninth exemplary embodiment described above, the vehicle front side portion of the piece 24 is moved by the wood member 22. However, configuration may be such that both the vehicle front side portion and the vehicle rear side portion of the piece 24 are moved by the wood member 22.

Tenth Exemplary Embodiment

Figure 14A:
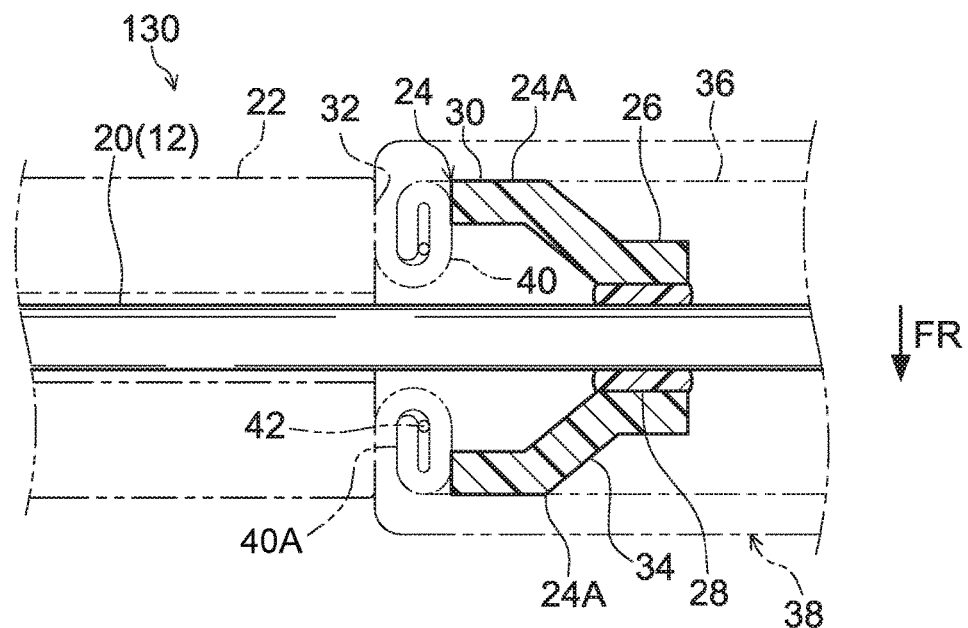
FIG. 14A is a cross-section (a cross-section along the position of line 4-4 in FIG. 1) illustrating relevant portions of a steering wheel according to a tenth exemplary embodiment of the present disclosure in an assembled state.

FIG. 14A is a cross-section (a cross-section at the position of line 4-4 in FIG. 1) illustrating relevant portions of a steering wheel 130 according to a tenth exemplary embodiment of the present disclosure.

The steering wheel 130 according to the present exemplary embodiment has substantially the same configuration as the first exemplary embodiment, with the exception of the following points.

As illustrated in FIG. 14A, in the steering wheel 130 according to the present exemplary embodiment, the end wall 30A of the first exemplary embodiment is not provided at the large diameter portion 30 of the piece 24, and the inside of the piece 24 is open toward the wood member 22 side. The dimension of the gap 32 between the piece 24 and the wood member 22 is enlarged, and the insertion portion 40 (including the tube portion 40A) of the leather piece 38 is wound about an inner side of the leather piece 38, such that the dimension of the insertion portion 40 in the axial direction of the leather piece 38 is enlarged in the gap 32.

Figure 14B:
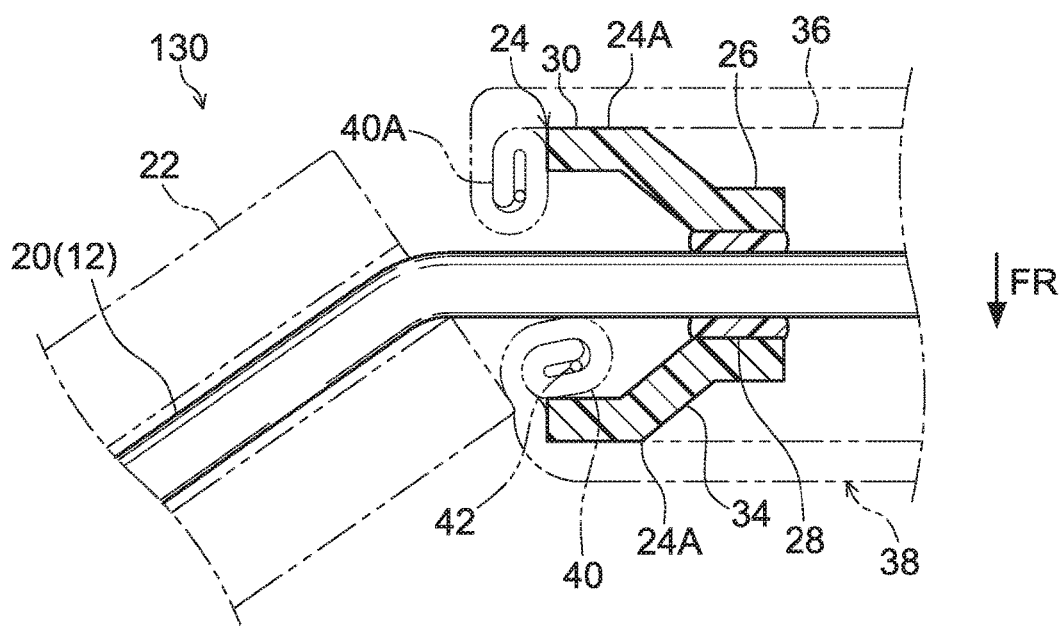
FIG. 14B is a cross-section (a cross-section along the position of line 4-4 in FIG. 1) illustrating relevant portions of a steering wheel according to the tenth exemplary embodiment of the present disclosure during tilting of a wooden member.

Thus, as illustrated in FIG. 14B, similarly to in the first exemplary embodiment, in a vehicle emergency (such as a collision), when the wood member 22 is tilted toward the vehicle front side with respect to the piece 24 and load (impact) has been input from the vehicle front side portion of the wood member 22 to the vehicle front side portion (the portion at the opposite side to the occupant) of the piece 24 through the insertion portion 40 of the leather piece 38, a vehicle front side portion of the insertion portion 40 is moved inside the piece 24 by the wood member 22. This enables load input to the wood member 22 from the piece 24 to be reduced, and enables damage to the wood member 22 by the piece 24 to be suppressed.

The insertion portion 40 is moved inside the piece 24 by the wood member 22. Thus, the insertion portion 40 can be moved inside the piece 24 simply by opening the inside of the piece 24 toward the wood member 22 side, enabling the insertion portion 40 to be moved inside the piece 24 using a simple configuration.

The vehicle front side portion of the insertion portion 40 is capable of moving inside the piece 24. Thus, as described above, even when load has been input from the vehicle front side portion of the wood member 22 to the vehicle front side portion of the insertion portion 40, damage to the wood member 22 by the piece 24 can be suppressed due to the vehicle front side portion of the insertion portion 40 being moved inside the piece 24 by the vehicle front side portion of the wood member 22.

In the present exemplary embodiment, the insides of the vehicle front side portion and the vehicle rear side portion of the piece 24 are open toward the wood member 22 side. However, configuration may be such that only the inside of the vehicle front side portion of the piece 24 is open toward the wood member 22 side.

In the present exemplary embodiment, the vehicle front side portion of the insertion portion 40 is moved inside the piece 24 by the wood member 22. However, configuration may be such that both the vehicle front side portion and a vehicle rear side portion of the insertion portion 40 are moved inside the piece 24 by the wood member 22.

In the first exemplary embodiment to the tenth exemplary embodiment described above, the piece 24 is configured by the pair of configuration bodies 24A. However, the piece 24 may be configured by three or more configuration bodies 24A.

In the first exemplary embodiment to the tenth exemplary embodiment described above, the wood member 22 made of wood serves as a decorative body of the present disclosure. However, the decorative body of the present disclosure may be made of bamboo or the like, or the surface of a body for decoration may be covered by a decorative material that has a wood-effect, a bamboo-effect, or the like.

What is claimed is:

1. A steering wheel comprising:
   a metal core;
   a resin body made of resin that covers the metal core;
   a decorative body that is provided separately from the resin body, the decorative body covering the metal core; and
   a placement member surrounding the metal core that is configured by a vehicle front side portion and a vehicle rear side portion fixed together, the placement member being disposed between the resin body and the decorative body, the rear side portion including first and second walls extending different radial distances from the metal core;
   wherein the placement member comprises a thinned portion that connects the first and second walls of the placement member, and
   wherein, when the decorative body is relatively displaced toward a vehicle front side and moves along the metal core toward the resin body, the thinned portion is broken and the first and second walls of the rear side portion slidably overlap along the metal core such that the front side of the placement member separates from the rear side of the placement member.

2. The steering wheel of claim 1, wherein the portion of the vehicle front side portion of the placement member is moved along the metal core by the decorative body.

3. The steering wheel of claim 1, further comprising:
   an attachment portion provided at the vehicle front side portion of the placement member that provides an attachment between the vehicle front side portion of the placement member and the metal core;
   wherein when the decorative body breaks the thinned portion of the placement member the attachment between the vehicle front side portion of the placement member and the metal core is released, and the vehicle front side portion of the placement member is moved by the decorative body.

4. The steering wheel of claim 1, wherein only the portion of the vehicle front side portion of the placement member moved by the decorative body presses the resin body.

5. A steering wheel comprising:
   a metal core;
   a resin body made of resin that covers the metal core;
   a decorative body that is provided separately from the resin body, the decorative body covering the metal core; and
   a placement member surrounding the metal core that is configured by a vehicle front side portion and a vehicle rear side portion fixed together, the placement member being disposed between the resin body and the decorative body and covering material that covers the placement member and that is provided with an insertion portion inserted between the decorative body and the placement member, the rear side portion including first and second parallel walls extending different radial distances from the metal core,
   wherein the placement member comprises a thinned portion that connects the first and second walls of the placement member, and
   wherein a portion of the vehicle front side portion of the placement member separates from the vehicle rear side portion and is moved toward the resin body when the decorative body has been displaced with respect to the placement member toward a vehicle front side, the thinned portion breaks, the insertion portion is moved inside the placement member by the decorative body, and the first and second walls of the rear side portion slidably overlap along the metal core.

* * * * *